US012720213B2

(12) United States Patent
Georgis et al.

(10) Patent No.: US 12,720,213 B2
(45) Date of Patent: Aug. 25, 2026

(54) REGIONS OF INTEREST IN AUTOFOCUS PROCESSING

(71) Applicant: QUALCOMM Incorporated, San Diego, CA (US)

(72) Inventors: Nikolaos Georgis, San Diego, CA (US); Lan Luo, San Diego, CA (US); Lei Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 18/828,770

(22) Filed: Sep. 9, 2024

(65) Prior Publication Data

US 2026/0075326 A1 Mar. 12, 2026

(51) Int. Cl.

*H04N 23/85* (2023.01)
*G06V 10/25* (2022.01)
*H04N 23/67* (2023.01)

(52) U.S. Cl.

CPC ............. *H04N 23/85* (2023.01); *G06V 10/25* (2022.01); *H04N 23/675* (2023.01)

(58) Field of Classification Search

CPC ...... H04N 23/85; H04N 23/67; H04N 23/675; G06T 5/10; G06T 5/20; G06V 10/25

See application file for complete search history.

(56) References Cited

U.S. PATENT DOCUMENTS

2010/0309364 A1* 12/2010 Brunner ................. H04N 5/772 348/E5.045
2016/0142616 A1* 5/2016 Ma ........................... G02B 7/28 348/349
2017/0064232 A1* 3/2017 Lim ..................... H04N 25/134
2025/0173992 A1* 5/2025 Novikov ................ G06V 10/56

OTHER PUBLICATIONS

Blelloch G. E., "Prefix Sums and Their Applications", School of Computer Science, Carnegie Mellon University, Nov. 1990, Synthesis of Parallel Algorithms, Edited by John H. Reif, Morgan Kaufmann, 1991, pp. 35-60.

* cited by examiner

*Primary Examiner* — Kelly L Jerabek

(74) *Attorney, Agent, or Firm* — QUALCOMM Incorporated

(57) ABSTRACT

One or more processors of a computing device may receive image data obtained via an image sensor of a camera. The one or more processors may apply one or more horizontal filters to the image data to generate horizontally filtered image data and may apply one or more vertical filters to the image data to generate vertically filtered image data. The one or more processors may generate a first accumulation matrix for the horizontally filtered image data and may generate a second accumulation matrix for the vertically filtered image data. The one or more processors may determine autofocus statistics based on the first accumulation matrix and the second accumulation matrix and may output information to adjust one or more lenses of the camera based on the autofocus statistics.

18 Claims, 10 Drawing Sheets

466

430

| | | | | | |
|---|---|---|---|---|---|
| 3 | 1 | -1 | 4 | 2 | 3 |
| 2 | -3 | 4 | 1 | 2 | 1 |
| 1 | 2 | 1 | 1 | -2 | 2 |
| 0 | 1 | -2 | 2 | 1 | 3 |
| -1 | 2 | 4 | 1 | 2 | -1 |

REGIONS OF INTEREST IN AUTOFOCUS PROCESSING

TECHNICAL FIELD

This disclosure relates to image processing.

BACKGROUND

A camera device includes one or more cameras that capture frames (e.g., images). Examples of the camera device include stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, gaming devices, computer devices that include cameras, such as so-called "web-cams," smartwatch, a device equipped with own camera, a device configured to control another device equipped with a camera, or any device with digital imaging or video capabilities. A camera device processes the captured frames and outputs the frames for display. In some examples, the camera device controls the exposure, focus, and white balance to capture high quality images.

In some examples, a camera may perform autofocus techniques to automatically bring one or more objects into focus. Autofocus may refer to determining the optimal focal length of the lens of the camera in order to substantially optimize the focus of the image. Performing autofocus techniques may involve processing camera data to identify whether an image is out of focus. When an image is out of focus, a camera may perform autofocus techniques to automatically control a focus of the camera. For example, a camera may adjust a distance between one or more camera lenses and a camera sensor to adjust a focus of the camera.

SUMMARY

In general, this disclosure describes techniques for determining autofocus (AF) statistics based on images captured by a camera. One or more processors of a camera device may receive a camera image captured by a camera, such as in a Bayer format as one example, and the one or more processors may determine autofocus statistics from the camera image prior to performing a demosaicing process on the camera image to reconstruct full resolution color planes from the camera image.

The camera image may include a set of sample values, where each sample value may be an intensity of the corresponding sample. The one or more processors may perform filtering of the camera image, such as by applying one or more infinite impulse response (IIR) filters to generate sharpness values for the camera image. However, applying such filters to the camera image may be computationally expensive and may not be easily parallelizable.

In accordance with aspects of this disclosure, the one or more processors may apply separate horizontal and vertical filters to the image data of the camera image. The one or more processors may apply one or more horizontal IIR filters to the image data of the camera image to generate horizontally filtered image data and may apply one or more vertical IIR filters to the image data of the camera image to generate vertically filtered image data.

The one or more processors may determine autofocus statistics, such as sharpness values, from the horizontally filtered image data and the vertically filtered image data. The one or more processors may determine the horizontal sharpness for a region of interest based on the horizontally filtered image data and may determine the vertical sharpness for the region of interest based on the vertically filtered image data. For example, the one or more processors may determine the horizontal sharpness for the region of interest as a sum of the sharpness values within the region of interest in the horizontally filtered image data and may determine the vertical sharpness for the region of interest as a sum of the sharpness values within the region of interest in the vertically filtered image data. The one or more processors may use the horizontal sharpness and vertical sharpness to output information to adjust one or more lenses of the camera.

To enable determination of sharpness values within a region of interest in constant time, the one or more processors may generate an accumulation matrix for the horizontally filtered image data and an accumulation matrix for the vertically filtered image data. The accumulation matrix for the horizontally filtered image data and the accumulation matrix for the vertically filtered image data may, in some examples, be summed-area tables, and may enable the one or more processors to determine the sum of sharpness values for regions of interest in the camera image using four sample values from one of the accumulation matrices.

The techniques of this disclosure may increase the accuracy of autofocus statistics. Because the demosaicing process of images may cause intermixing of the characteristics within the different color channels, by determining autofocus statistics from a camera image prior to performing demosaicing of the camera image, the techniques of this disclosure may increase the accuracy of the determined autofocus statistics.

The techniques of this disclosure may also decrease the amount of processing time that may be required to determine autofocus statistics as compared with other techniques. By performing separate horizontal and vertical filtering on image data of a camera image, the techniques of this disclosure reduce the computational complexity of filtering the camera image, while being able to use parallel processing features of processors to perform the horizontal and vertical filtering of the camera image in parallel. Reducing the computational complexity of filtering the camera image may reduce the number of processing cycles used to filter the image data of the camera image. Further, by using accumulation matrices to determine sums of sharpness values in regions of interest, the techniques of this disclosure enable determination of sharpness values in constant time, while being able to use parallel processing features of processors to determine sharpness values of multiple regions of interest within a camera image in parallel.

By increasing the speed at which one or more processors of a camera device can determine autofocus statistics, the techniques of this disclosure may enable the one or more processors to determine autofocus statistics (e.g., of a region of interest in the image data) during a blanking period prior to the camera device capturing a subsequent image. By being able to determine autofocus statistics of a region of interest in the image data prior to the camera device capturing a subsequent image, the techniques of this disclosure may be able to output information to adjust the focus of the camera prior to capturing the next image. In this way, the example techniques may enable the camera of the camera device to more quickly control a focus of the camera of the camera device, thereby improving the operations of the camera of the camera device.

In some aspects, the techniques described herein relate to a computing device including: one or more memories configured to store image data obtained via an image sensor of a camera; and one or more processors implemented in circuitry, coupled to the one or more memories, and configured to: apply one or more horizontal filters to the image data to generate horizontally filtered image data; apply one or more vertical filters to the image data to generate vertically filtered image data; generate a first accumulation matrix for the horizontally filtered image data; generate a second accumulation matrix for the vertically filtered image data; determine autofocus statistics based on the first accumulation matrix and the second accumulation matrix; and adjust one or more lenses of the camera based on the autofocus statistics.

In some aspects, the techniques described herein relate to a method including: receiving image data obtained via an image sensor of a camera; applying one or more horizontal filters to the image data to generate horizontally filtered image data; applying one or more vertical filters to the image data to generate vertically filtered image data; generating a first accumulation matrix for the horizontally filtered image data; generating a second accumulation matrix for the vertically filtered image data; determining autofocus statistics based on the first accumulation matrix and the second accumulation matrix; and outputting information to adjust one or more lenses of the camera based on the autofocus statistics.

In some aspects, the techniques described herein relate to a computer-readable storage medium storing instructions thereon that when executed cause one or more processors to: receive image data obtained via an image sensor of a camera; and apply one or more horizontal filters to the image data to generate horizontally filtered image data; apply one or more vertical filters to the image data to generate vertically filtered image data; generate a first accumulation matrix for the horizontally filtered image data; generate a second accumulation matrix for the vertically filtered image data; determine autofocus statistics based on the first accumulation matrix and the second accumulation matrix; and output information to adjust one or more lenses of the camera based on the autofocus statistics.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
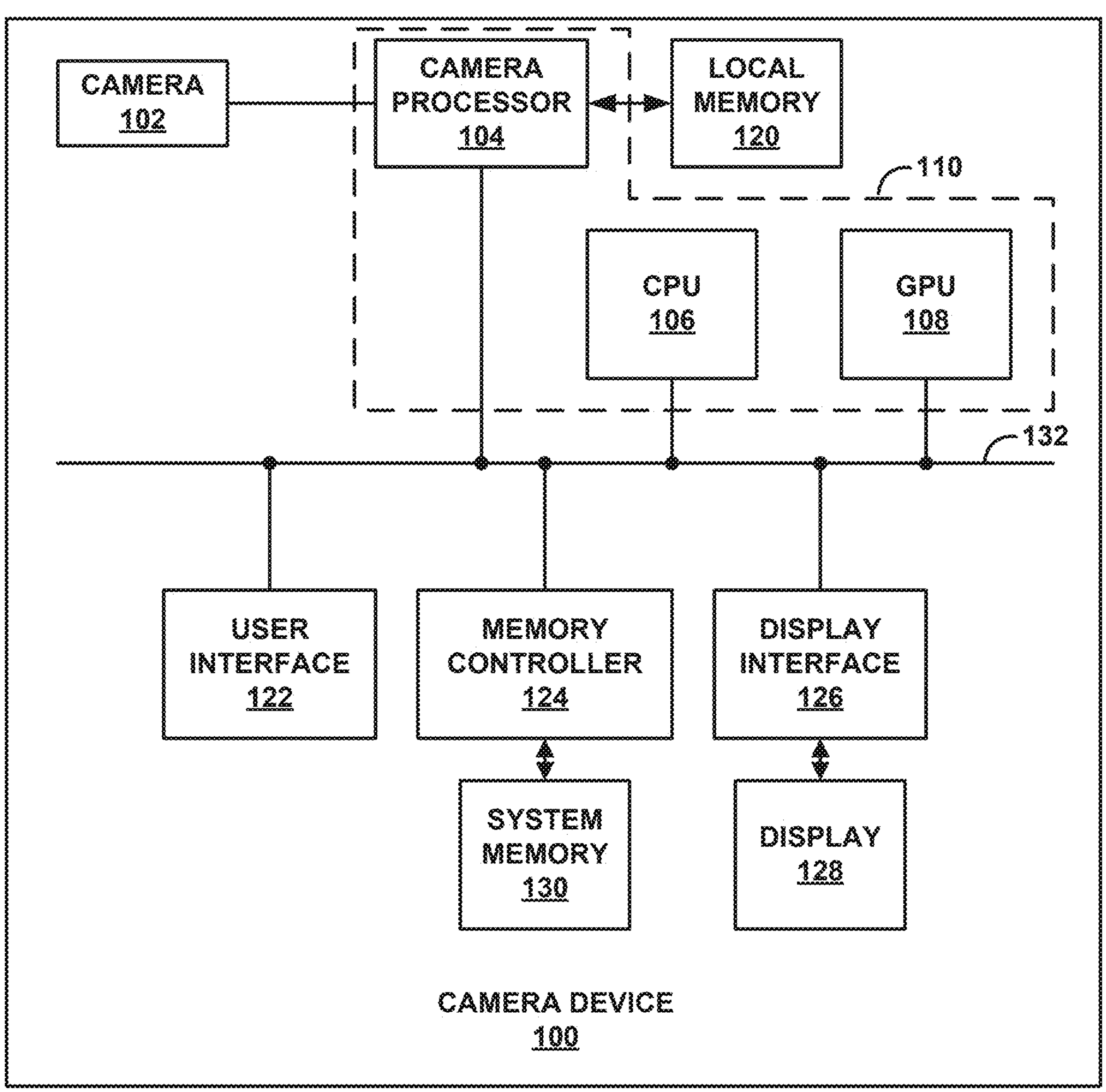
FIG. 1 is a block diagram of a device configured to determine autofocus statistics according to the techniques of this disclosure.

The example techniques described in this disclosure relate to determining autofocus statistics that are used to determine camera focus (e.g., depth where a camera should focus for image or video capture). A camera device may perform a passive autofocus technique, such as a contrast detection autofocus algorithm, that analyzes the autofocus statistics for one or more regions of interest in a camera image to determine whether the camera is well-focused, and may determine an adjustment to one or more lenses of the camera based on the determination of whether the camera well-focused. For example, the camera device may adjust the one or more lenses of the camera based on the autofocus statistics (e.g., for one or more regions of interest in image data like the camera frame) in an attempt to increase and/or decrease the focus values for the one or more regions of interest in the image data.

A digital camera includes an image sensor with a plurality of photodetectors. The digital camera may also include a Bayer filter placed over the photodetectors. The Bayer filter is configured to pass through one of the primary colors (e.g., one of red (R), green (G), or blue (B)) of light. That is, each photodetector receives one of the primary colors of the light. The output from the Bayer filter may be referred to as a Bayer pattern image, or Bayer format samples. In the Bayer format, each of the colors may be associated with a color plane (e.g., red plane, green plane, and blue plane).

For example, the Bayer filter is a 2×2 grid that includes two green filters, one red filter, and one blue filter. This 2×2 grid is copied across the grid of photodetectors. Without the Bayer filter, each photodetector may output information indicative of the luminance (e.g., brightness) of the received light, in which case color information is lost. With a Bayer filter, each photodetector receives light with one color component (e.g., green, red, or blue). That is, for the photodetectors coupled to the green filter, these photodetectors receive the green component of the light, and output a sample value indicative of the green component. Similarly, for the photodetectors coupled to the red or blue filter, these photodetectors receive the red or blue component of the light, and output sample values indicative of the red or blue component, respectively.

The image data for the photodetectors may be considered to be in the Bayer color format. For example, the output from each of the photodetectors may contribute to one of a plurality of color planes. For instance, the photodetectors coupled to green filters output sample values for samples that form a green color plane, the photodetectors coupled to red filters output sample values for samples that form a red color plane, and the photodetectors coupled to the blue filters output sample values for samples that form a blue color plane.

The camera device, through a process referred to as demosaicing, reconstructs full resolution color planes (e.g., full resolution red plane (R plane), full resolution green plane (G plane), and full resolution blue plane (B plane)). The camera device then performs additional processing on the R plane, G plane, and B plane (collectively referred to as RGB planes) to generate image content for display. As one example, the camera device may perform warping or scaling using the RGB planes. As another example, the camera device may convert the RGB planes into other planes, like YUV planes (e.g., after downsampling), perform the warping or scaling on the YUV planes, and then reconvert the warped and/or scaled YUV planes into RGB planes to generate image content for display.

The Bayer format is provided for example purposes only. There may be other ways in which to generate color planes. Also, the techniques should not be considered limited to requiring color planes, but are used for example purposes.

In some examples, the camera device may extract autofocus statistics after performing demosaicing of image data. That is, the camera device may extract autofocus statistics from the full color image reconstructed via demosaicing of image data in the Bayer format. However, the process of demosaicing of image data may involve complex, nonlinear interpolation to estimate the missing color information in each pixel, which may cause intermixing of the characteristics within the different color channels. Such intermixing of characteristics within the different color channels may affect the accuracy and reliability of the collected autofocus statistics.

In accordance with aspects of this disclosure, a camera device may determine autofocus statistics from image data prior to performing demosaicing of the image data. By collecting autofocus statistics from image data prior to performing demosaicing of the image data, the techniques of this disclosure may avoid such intermixing of characteristics within the different color channels, thereby increasing the accuracy of the collected autofocus statistics.

The camera device may apply separate horizontal and vertical filters to image data of the camera image. The camera device may apply one or more horizontal IIR filters to the image data of the camera image to generate horizontally filtered image data and may apply one or more vertical IIR filters to image data of the camera image to generate vertically filtered image data. The camera device may apply the one or more horizontal IIR filters and the one or more horizontal IIR filters to the image data in parallel, in some examples.

The camera device may determine autofocus statistics, such as sharpness values, from the horizontally filtered image data and the vertically filtered image data. The camera device may (e.g., for a region of interest in the image data) determine the horizontal sharpness for the region of interest as a sum of the sharpness values within the region of interest in the horizontally filtered image data and may determine the vertical sharpness for the region of interest as a sum of the sharpness values within the region of interest in the vertically filtered image data. The camera device may use the horizontal sharpness and vertical sharpness for a region of interest to adjust one or more lenses of the camera.

To enable determination of sharpness values within a region of interest in constant time, the camera device may generate an accumulation matrix, such as a summed-area table or an integral image, for the horizontally filtered image data and an accumulation matrix for the vertically filtered image data. The accumulation matrix for the horizontally filtered image data and the accumulation matrix for the vertically filtered image data enables the camera device to determine the sum of sharpness values for regions of interest in the camera frame using four sample values from one of the summed-area tables The techniques of this disclosure may also decrease the amount of processing time that may be required to determine autofocus statistics as compared with other techniques. By performing separate horizontal and vertical filtering of a camera image, the techniques of this disclosure reduces the computational complexity of filtering the camera image, while being able to use parallel processing features of processors to perform the horizontal and vertical filtering of the camera image in parallel. Reducing the computational complexity of filtering the camera image may reduce the number of processing cycles used to filter the camera image. Further, by using summed-area tables to determine sums of sharpness values in regions of interest, the techniques of this disclosure enables determination of sharpness values in constant time, while being able to use parallel processing features of processors to determine sharpness values of multiple regions of interest within a camera image in parallel.

By increasing the speed at which the camera device can determine autofocus statistics, the techniques of this disclosure may enable the camera device to determine autofocus statistics during a blanking period prior to the camera device capturing a subsequent image frame. By being able to determine autofocus statistics of an image frame prior to the camera device capturing a subsequent image frame, the techniques of this disclosure may be able to adjust the focus of the camera prior to capturing the next image frame. In this way, the example techniques may enable the camera of the camera device to more quickly control a focus of the camera of the camera device, thereby improving the operations of the camera of the camera device.

FIG. 1 is a block diagram of a device configured to determine autofocus statistics according to the techniques of this disclosure. Examples of camera device 100 include processing systems in an automobile (e.g., an advance driver assistance system (ADAS)), processing systems in a robotics application, AR headsets, virtual reality (VR) headsets, stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, gaming devices, computer devices that include cameras, such as so-called "web-cams," or any device with digital imaging or video capabilities.

As illustrated in the example of FIG. 1, camera device 100 includes camera 102 (e.g., having a lens, a filter, and an image sensor), camera processor 104 and local memory 120 of camera processor 104, a central processing unit (CPU) 106, a graphical processing unit (GPU) 108, user interface 122, memory controller 124 that provides access to system memory 130, and display interface 126 that outputs signals that cause graphical data to be displayed on display 128. Camera processor 104, CPU 106, and GPU 108 are collectively referred to herein as one or more processors 110. That is, any combination of camera processor 104, CPU 106, and/or GPU 108 may perform the operations described herein as being performed by one or more processors 110.

Although the example of FIG. 1 illustrates camera device 100 including one camera 102, in some examples, camera device 100 may include a plurality of cameras 102, such as for omnidirectional image or video capture. Also, although camera device 100 is illustrated as including one camera processor 104, in some examples, there may be a plurality of camera processors (e.g., one for each of cameras 102) or one camera processor for each of one or more cameras 102.

Also, although the various components are illustrated as separate components, in some examples the components may be combined to form a system on chip (SoC). As an example, camera processor 104, CPU 106, GPU 108, and display interface 126 may be formed on a common integrated circuit (IC) chip. In some examples, one or more of camera processor 104, CPU 106, GPU 108, and display interface 126 may be in separate IC chips. Additional examples of components that may be configured to perform the example techniques include a digital signal processor (DSP). Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 120 and system memory 130 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 132. Bus 132 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of camera devices and/or other image processing systems with the same or different components may be used to implement the techniques of this disclosure.

Camera processor 104 is configured to receive camera frames (e.g., image frames) from camera 102, and process the camera frames to generate output frames for display. CPU 106, GPU 108, camera processor 104, or some other circuitry may be configured to process the output frame that includes image content generated by camera processor 104 into images for display on display 128. In some examples, GPU 108 may be further configured to render graphics content on display 128.

In some examples, camera processor 104 may be configured as an image processing pipeline. For instance, camera processor 104 may include a camera interface that interfaces between camera 102 and camera processor 104. Camera processor 104 may include additional circuitry to process the image content. Camera processor 104 outputs the resulting frames with image content (e.g., pixel values for each of the image pixels) to system memory 130 via memory controller 124.

CPU 106 may comprise a general-purpose or a special-purpose processor that controls operation of camera device 100. A user may provide input to camera device 100 to cause CPU 106 to execute one or more software applications. The software applications that execute on CPU 106 may include, for example, a media player application, a video game application, a graphical user interface application or another program. The user may provide input to camera device 100 via one or more input devices (not shown) such as a keyboard, a mouse, a microphone, a touch pad or another input device that is coupled to camera device 100 via user interface 122.

Memory controller 124 facilitates the transfer of data going into and out of system memory 130. For example, memory controller 124 may receive memory read and write commands, and service such commands with respect to system memory 130 in order to provide memory services for the components in camera device 100. Memory controller 124 is communicatively coupled to system memory 130. Although memory controller 124 is illustrated in the example of camera device 100 of FIG. 1 as being a processing circuit that is separate from both CPU 106 and system memory 130, in other examples, some or all of the functionality of memory controller 124 may be implemented on one or both of CPU 106 and system memory 130.

System memory 130 may store program modules and/or instructions and/or data that are accessible by camera processor 104, CPU 106, and GPU 108. For example, system memory 130 may store user applications, resulting frames from camera processor 104, etc. System memory 130 may additionally store information for use by and/or generated by other components of camera device 100. For example, system memory 130 may act as a device memory for camera processor 104.

In one or more examples, camera 102 includes an image sensor that includes a plurality of photodetectors arranged in a grid. A filter may be placed over the photodetectors to pass through a particular color component to each of the photodetectors. For purposes of illustration only, the filter is described as a Bayer filter, but other filters are possible. For instance, the Bayer filter includes a repeating 2×2 grid, where a 2×2 grid includes two green filters (e.g., to pass through the green color from light received at camera 102), one red filter (e.g., to pass through the red color from light received at camera 102), and one blue filter (e.g., to pass through the blue color from light received at camera 102).

One or more processors 110, such as camera processor 104, may receive, from camera 102, image data (e.g., of a camera frame) that is obtained via the Bayer filter of camera 102. For example, one or more processors 110 may receive a camera frame captured by camera 102 that is in the Bayer format. The image data of the camera frame may include a set of sample values, where each sample value may be an intensity of the corresponding sample in the image data.

To determine autofocus statistics of the image data, one or more processors 110 may perform filtering of the image data to determine sharpness values of the samples based on the sample values of the image data. For example, one or more processors 110 may apply one or more infinite impulse response (IIR) filters to the image data to the filtered image data containing sharpness values for the samples of the image data.

The one or more IIR filters may be implemented to respond to low frequencies occurring in severe defocus, and may be tuned depending on the scene being captured by camera 102 (e.g., default, low light, face, spotlight, etc.) The one or more IIR filters may act as a sharpness detector to emphasize changes in intensity between neighboring samples to output filtered image data that replace sample values with sharpness values. The filtered image data containing sharpness values for the samples of the image data in effect is a sharpness map of the image data.

One or more processors 110 may use the sharpness values in the filtered image data to perform autofocus of camera 102. For example, one or more processors 110 may, for a region of interest (ROI) in the image data, determine a sharpness value for the ROI that is the sum of sharpness values for the samples in the ROI in the filtered image data. Such sum of sharpness values for the ROI is also referred herein as a focus value for the ROI.

However, it may be computationally expensive for one or more processors 110 to apply one or more IIR filters to the image data because an IIR filter may, for a sample, takes into consideration the sample values of neighboring samples to determine a sharpness value for the sample. For example, an IIR filter, may for a sample, take into account values of samples in other rows and columns of the image data to determine a sharpness value for the sample.

In accordance with aspects of this disclosure, to reduce the amount of processing that may be needed to determine autofocus statistics for camera 102, one or more processors 110 may perform separate horizontal filtering and vertical filtering of image data to determine sharpness values for samples of the image data. For example, one or more processors 110 may apply one or more horizontal IIR filters to the image data to perform horizontal IIR filtering of the image data to generate horizontally filtered image data. One or more processors 110 may also apply one or more vertical IIR filters to the image data to perform vertical IIR filtering of the image data to generate vertically filtered image data.

A horizontal IIR filter may independently process each row of samples in the image data. Thus, a horizontal IIR filter may, for a sample, only take into consideration the sample values of neighboring samples in the same row to determine a sharpness value for the sample. Similarly, a vertical IIR filter may independently process each column of samples in the image data. Thus, a vertical IIR filter may, for a sample, only take into consideration the sample values of neighboring samples in the same column to determine a sharpness value for the sample. As can be seen, applying separate horizontal and vertical IIR filters to image data may reduce the computational complexity of deriving sharpness values for samples of image data.

Further, one or more processors 110 may utilize multithreading and/or parallel processing features of one or more processors 110 to apply separate horizontal and vertical IIR filters to image data. One or more processors 110 may perform horizontal IIR filtering and vertical IIR filtering using separate processors and/or processing cores, or may execute the horizontal IIR filter and the vertical IIR filter using different processing threads, and the like. Using utilize multithreading and/or parallel processing features of one or more processors 110 to apply separate horizontal and vertical IIR filters to image data may enable one or more processors 110 to concurrently (e.g., at the same time) perform one or more operations of the horizontal IIR filter and one or more operations of the vertical IIR filter. That is, one or more processors 110 may be able to concurrently perform one or more operations of applying a horizontal IIR filter to the image data and one or more operations of applying a vertical IIR filter to the image data. In this way, applying separate horizontal and vertical IIR filters to image data may increase the speed at which one or more processors 110 is able to autofocus statistics for camera 102.

To further increase the speed of determining autofocus statistics for camera 102, one or more processors 110 may generate accumulation matrices, which may be in the form of summed-area tables, also known as integral images, for the filtered image data that enables one or more processors 110 to more quickly determine focus values for regions of interest in the filtered image data. An accumulation matrix for filtered image data may enable one or more processors 110 to perform constant time determinations of focus values for regions of interests in the filtered image data. As described in further detail below, one or more processor 110 may be able to determine, for a ROI of any size in the image data, a focus value for the ROI, which is the summed sharpness values of the samples in the ROI in the filtered image data, based on looking up and performing arithmetic operations on four sample values in the corresponding accumulation matrix, thereby transforming computation of autofocus statistics from compute to a simple memory lookup.

One or more processors 110 may determine an accumulation matrix for the horizontally filtered image data that is the result of performing horizontal filtering of the image data. One or more processors 110 may also determine an accumulation matrix for the vertically filtered image data that is the result of performing vertical filtering of the image data. One or more processors 110 may utilize multithreading and/or parallel processing features of one or more processors 110 to concurrently determine horizontal and vertical focus values for an ROI based on the accumulation matrices for the horizontally filtered image data and the vertically filtered image data. One or more processors 110 may also utilize multithreading and/or parallel processing features of one or more processors 110 to concurrently determine horizontal and vertical focus values for multiple regions of interest based on the accumulation matrices for the horizontally filtered image data and the vertically filtered image data. In this way, utilizing accumulation matrices for determining focus values of ROIs may further increase the speed at which one or more processors 110 is able to autofocus statistics for camera 102.

One or more processors 110 may output information to adjust one or more lenses of camera 102 based on the autofocus statistics. Examples of the autofocus statistics may be focus values, and the focus values may be for one or more regions of interest in the image data. In some examples, one or more processors 110 may perform a passive autofocus technique, such as a contrast detection autofocus algorithm, or a neural network-based autofocus algorithm, that analyzes the autofocus statistics, such as focus values, for one or more regions of interest in the image data, to determine whether the image data is well-focused. One or more processors 110 may determine an adjustment to one or more lenses of camera 102 based on the determination of whether the image data is well-focused, and may output information to adjust the one or more lenses of camera 102 based on the determined adjustment. For example, one or more processors 110 may output information (e.g., to camera 102), such as instructions, to adjust the one or more lenses of camera 102 based on the autofocus statistics for one or more regions of interest in the image data in an attempt to increase and/or decrease the focus values for the one or more regions of interest in the image data.

Figure 2:
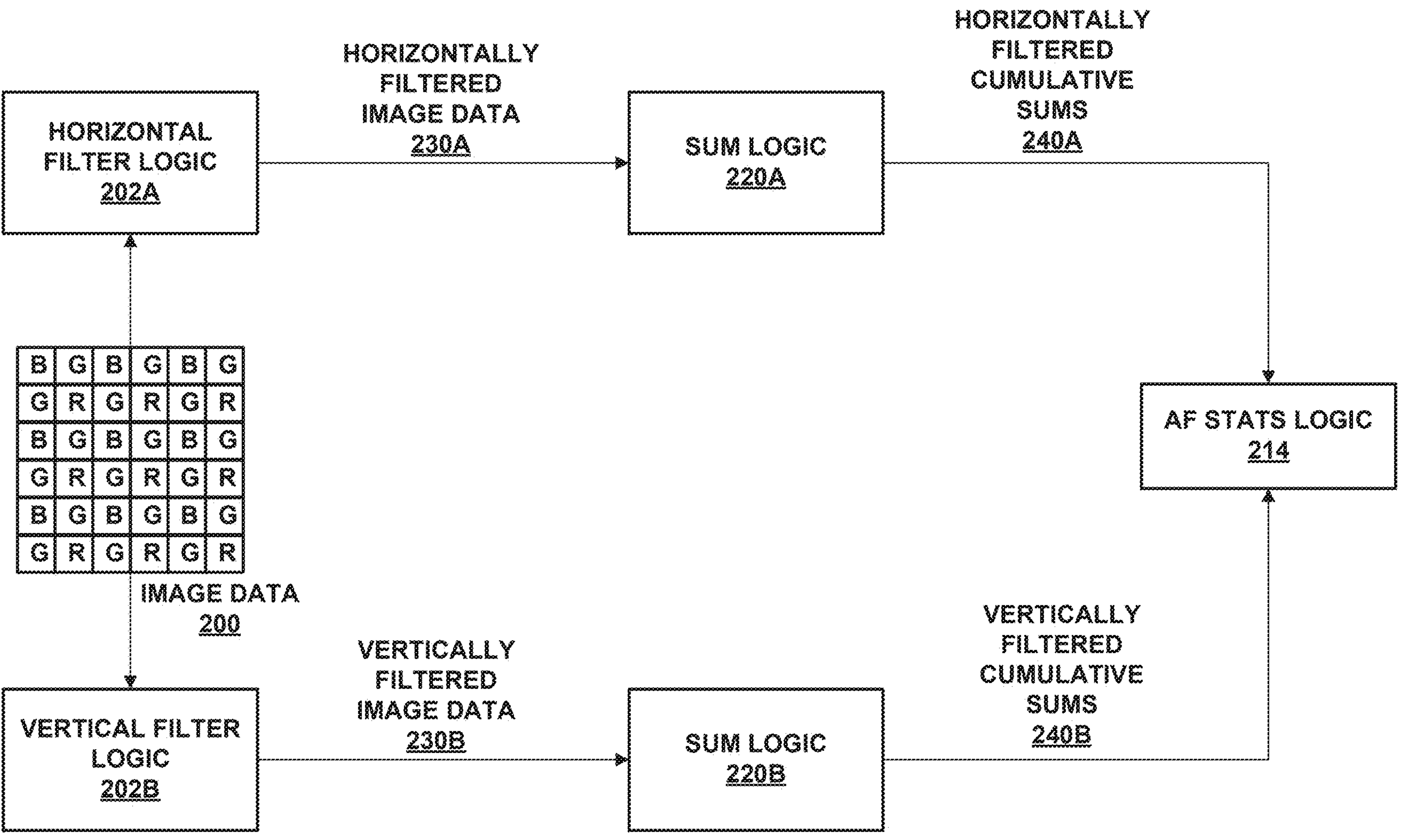
FIG. 2 is a flow diagram illustrating an example technique of determining autofocus statistics performed by one or more processors shown in FIG. 1.

FIG. 2 is a flow diagram illustrating an example technique of determining autofocus statistics performed by one or more processors 110 shown in FIG. 1.

As shown in FIG. 2, one or more processors 110 may implement horizontal filter logic 202A that performs horizontal filtering of image data 200 (e.g., a camera image captured by camera 102) that may be in a Bayer format and to thereby generate a horizontally filtered image data 230A. Such horizontal filter logic 202A may be in the form of logical circuitry or digital logic in one or more processors 110, or code that is executed by one or more processors 110

To perform horizontal filtering of image data 200, one or more processors 110 may be configured to apply one or more horizontal filters, such as one or more horizontal finite impulse response (FIR) filters, one or more horizontal infinite impulse response (IIR) filters, and the like to image data 200. As described in this application, applying one or more horizontal filters to samples of the image data may generate sharpness values for the samples of the image data.

In some examples, to perform horizontal filtering of image data 200, one or more processors 110 may also be configured to perform coring (e.g., soft thresholding) of the result of applying the one or more horizontal filters to image data 200 to generate horizontally filtered image data 230A. One or more processors 110 may perform coring to the result of applying the one or more horizontal filters to image data 200 to perform soft thresholding of the sharpness values of the samples that is the result of applying the one or more horizontal filters to image data 200. Performing soft thresholding of the sharpness values of the samples may deemphasize (e.g., set to zero) values lower than a specified threshold. Performing soft thresholding of the sharpness values of the samples may suppress small signal variations, which may sometimes be noise, while not affective larger features in the sharpness values.

One or more processors 110 may implement vertical filter logic 202B that performs vertical filtering of image data 200 that is in a Bayer format and to thereby generate vertically filtered image data 230B. Such vertical filter logic 202B may be in the form of logical circuitry or digital logic in one or more processors 110, or code that is executed by one or more processors 110

To perform vertical filtering of image data 200, one or more processors 110 may be configured to apply one or more vertical filters, such as one or more vertical FIR filters, one or more vertical IIR filters, and the like to image data 200. As described in this application, applying one or more vertical filters to samples of the image data may generate sharpness values for the samples of the image data.

In some examples, to perform vertical filtering of image data 200, one or more processors 110 may also be configured to perform coring of the result of applying the one or more vertical filters to image data 200 to generate vertically filtered image data 230B. One or more processors 110 may perform coring to the result of applying the one or more vertical filters to image data 200 to perform soft thresholding of the sharpness values of the samples that is the result of applying the one or more vertical filters to image data 200. Performing soft thresholding of the sharpness values of the samples may deemphasize (e.g., set to zero) values lower than a specified threshold. Performing soft thresholding of the sharpness values of the samples may suppress small signal variations, which may sometimes be noise, while not affective larger features in the sharpness values.

One or more processors 110 may implement sum logic 220A that generates, for horizontally filtered image data 230A, horizontally filtered cumulative sums 240A that is an accumulation matrix of horizontally filtered image data 230A. In some examples, the accumulation matrix of horizontally filtered image data 230A is a summed-area table, also referred to as an integral image, of horizontally filtered image data 230A. Such sum logic 220A may be in the form of logical circuitry or digital logic in one or more processors 110, or code that is executed by one or more processors 110

For example, one or more processors 110 may be configured to perform horizontal cumulative summing of horizontally filtered image data 230A to thereby generate horizontally filtered intermediate sums and to perform vertical cumulative summing of the horizontally filtered intermediate sums to generate horizontally filtered cumulative sums 240A. In another example, one or more processors 110 may be configured to perform vertical cumulative summing of horizontally filtered image data 230A to thereby generate horizontally filtered intermediate sums and to perform horizontal cumulative summing of the horizontally filtered intermediate sums to generate horizontally filtered cumulative sums 240A.

One or more processors 110 may implement sum logic 220B that generates, for vertically filtered image data 230B, vertically filtered cumulative sums 240B that is an accumulation matrix of vertically filtered image data 230B. In some examples, the accumulation matrix of vertically filtered image data 230B is a summed-area table, also referred to as an integral image, of vertically filtered image data 230B. Such sum logic 220B may be in the form of logical circuitry or digital logic in one or more processors 110, or code that is executed by one or more processors 110

For example, one or more processors 110 may be configured to perform horizontal cumulative summing of vertically filtered image data 230B to thereby generate vertically filtered intermediate sums and to perform vertical cumulative summing of the vertically filtered intermediate sums to generate vertically filtered cumulative sums 240B. In another example, one or more processors 110 may be configured to perform vertical cumulative summing of vertically filtered image data 230B to thereby generate vertically filtered intermediate sums and to perform horizontal cumulative summing of the vertically filtered intermediate sums to generate vertically filtered cumulative sums 240B.

One or more processors 110 may implement autofocus statistics logic 214 that determines autofocus statistics for regions of interest (ROIs) within image data 200 based on horizontally filtered cumulative sums 240A and vertically filtered cumulative sums 240B. Such autofocus statistics logic 214 may be in the form of logical circuitry or digital logic in one or more processors 110, or code that is executed by one or more processors 110. One or more processors 110 may be configured to determine, for a region of interest in image data 200, autofocus statistics such as a vertical sharpness, also referred to herein as baf_v1_sharp, a horizontal sharpness, also referred to herein as baf_h1_sharp, a vertical sum, also referred to herein as baf_v1_sum, a horizontal sum, also referred to herein as baf_h1_sum, a vertical count, also referred to herein as baf_v1_cnt, and a horizontal count, also referred to herein as baf_h1_cnt.

The horizontal sharpness, horizontal sum, and horizontal count is referred to herein as horizontal autofocus statistics, and one or more processors 110 may determine one or more of the horizontal autofocus statistics based on horizontally filtered cumulative sums 240A. One or more processors 110 may determine the horizontal sharpness for a region of interest in image data 200 as the sum of sharpness values specified in horizontally filtered image data 230A within the region of interest. One or more processors 110 may determine the sum of sharpness values specified in horizontally filtered image data 230A within the region of interest using the accumulated sums in horizontally filtered cumulative sums 240A.

Specifically, one or more processors 110 may determine the sum of sharpness values specified in horizontally filtered image data 230A within a region of interest as the corresponding value of the lower right corner sample of the region of interest in horizontally filtered cumulative sums 240A, minus the corresponding value of the neighboring top right sample to the region of interest in horizontally filtered cumulative sums 240A, minus the corresponding value of the neighboring bottom right sample to the region of interest in horizontally filtered cumulative sums 240A, plus the corresponding value of the neighboring sample that is above and to the left of the region of interest in horizontally filtered cumulative sums 240A.

One or more processors 110 may be able to determine the horizontal sharpness for a region of interest of any size based on the values of these four samples in horizontally filtered cumulative sums 240A, enabling one or more processors 110 to determine the horizontal sharpness for a region of interest in constant time regardless of the size of the region of interest. This technique for determining the horizontal sharpness for a region of interest is described in further detail with respect to FIGS. 4A-4D.

The ve rtical sharpness, vertical sum, and vertical count is referred to herein as vertical autofocus statistics, and one or more processors 110 may determine one or more of the vertical autofocus statistics based on vertically filtered cumulative sums 240B.

One or more processors 110 may determine the vertical sharpness for a region of interest in image data 200 as the sum of sharpness values specified in vertically filtered image data 230B within the region of interest. One or more processors may determine the sum of sharpness values specified in vertically filtered image data 230B within the region of interest using the accumulated sums in vertically filtered cumulative sums 240B.

Specifically, one or more processors 110 may determine the sum of sharpness values specified in vertically filtered image data 230B within a region of interest as the corresponding value of the lower right corner sample of the region of interest in vertically filtered cumulative sums 240B, minus the corresponding value of the neighboring top right sample to the region of interest in vertically filtered cumulative sums 240B, minus the corresponding value of the neighboring bottom right sample to the region of interest in vertically filtered cumulative sums 240B, plus the corresponding value of the neighboring sample that is above and to the left of the region of interest in vertically filtered cumulative sums 240B.

One or more processors 110 may be able to determine the vertical sharpness for a region of interest of any size based on the values of these four samples in vertically filtered cumulative sums 240B, enabling one or more processors 110 to determine the vertical sharpness for a region of interest in constant time regardless of the size of the region of interest. This technique for determining the vertical sharpness for a region of interest is described in further detail with respect to FIGS. 4A-4D.

One or more processors 110 may also utilize multithreading and/or parallel processing features of one or more processors 110 to concurrently determine horizontal and vertical sharpness values for multiple regions of interest based on horizontally filtered cumulative sums 240A and vertically filtered cumulative sums 240B. For example, one or more processors 110 may concurrently calculate, using multiple processors, multiple processing cores, multiple threads, and the like, multiple autofocus statistics, such as vertical sharpness and horizontal sharpness, of an ROI. One or more processors 110 may also concurrently calculate, using multiple processors, multiple processing cores, multiple threads, and the like, multiple autofocus statistics, such as vertical sharpness and horizontal sharpness, of multiple ROIs.

One or more processors 110 may use a technique similar to the technique described above with respect to summing of horizontally filtered image data 230A and vertically filtered image data 230B to generate vertical sums and horizontal sums, respectively. For example, image data 200, in a Bayer format, includes red (R) pixels, blue (B) pixels, green red (Gr) pixels, which are green pixels directly adjacent to a red pixel, and green blue (Gb) pixels, which are green pixels directly adjacent to a blue pixel. One or more processors 110 may perform such summing only for pixels where the sharpness values of horizontally filtered image data 230A and vertically filtered image data 230B is non-zero.

To determine horizontal sums, sum logic 220A may also perform horizontal cumulative summing of Bayer values of Gr pixels or luminance values defined as Y=(R+Gr+Gb+B+2)>>2 in image data 200, for pixels having non-zero sharpness values in horizontally filtered image data 230A, to thereby generate horizontally filtered intermediate sums and to perform vertical cumulative summing of the horizontally filtered intermediate sums to generate cumulative sums of such Bayer values or luminance values that are also included in horizontally filtered cumulative sums 240A.

Similarly, to determine vertical sums, sum logic 220B may perform vertical cumulative summing of Bayer values of Gr pixels or luminance values defined as Y=(R+Gr+Gb+B+2)>>2 in image data 200, for pixels having non-zero sharpness values in vertically filtered image data 230B, to thereby generate vertically filtered intermediate sums and to perform horizontal cumulative summing of the vertically filtered intermediate sums to generate cumulative sums of such Bayer values or luminance values that are also included in vertically filtered cumulative sums 240B.

Similar to determining the horizontal sharpness in a region of interest, one or more processors 110 may determine the horizontal sum for a region of interest as the corresponding sums of such Bayer values or luminance values in the lower right corner sample of the region of interest in horizontally filtered cumulative sums 240B, minus the corresponding sums of such Bayer values or luminance values of the neighboring top right sample to the region of interest in horizontally filtered cumulative sums 240A, minus the corresponding sums of such Bayer values or luminance values of the neighboring bottom right sample to the region of interest in horizontally filtered cumulative sums 240A, plus the corresponding sums of such Bayer values or luminance values of the neighboring sample that is above and to the left of the region of interest in horizontally filtered cumulative sums 240A.

Similar to determining the vertical sharpness in a region of interest, one or more processors 110 may determine the vertical sum for a region of interest as the corresponding sums of such Bayer values or luminance values in the lower right corner sample of the region of interest in vertically filtered cumulative sums 240B, minus the corresponding sums of such Bayer values or luminance values of the neighboring top right sample to the region of interest in vertically filtered cumulative sums 240B, minus the corresponding sums of such Bayer values or luminance values of the neighboring bottom right sample to the region of interest in vertically filtered cumulative sums 240B, plus the corresponding sums of such Bayer values or luminance values of the neighboring sample that is above and to the left of the region of interest in vertically filtered cumulative sums 240B.

One or more processors 110 may use a technique similar to the technique described above with respect to summing of horizontally filtered image data 230A and vertically filtered image data 230B to generate vertical counts and horizontal counts, respectively.

To determine horizontal counts, sum logic 220A may set each pixel in image data 200 having a non-zero sharpness values in horizontally filtered image data 230A to 1 and set each pixel in image data 200 having a zero sharpness value in horizontally filtered image data 230A to 0. Sum logic 220A may perform horizontal cumulative summing of the 1s to thereby generate horizontally filtered intermediate sums and to perform vertical cumulative summing of the horizontally filtered intermediate sums to generate cumulative sums of counts that are also included in horizontally filtered cumulative sums 240A.

Similarly, to determine vertical sums, sum logic 220B may set each pixel in image data 200 having non-zero sharpness values in vertically filtered image data 230B to 1 and set each pixel in image data 200 having a zero sharpness value in vertically filtered image data 230B to 0, to thereby generate vertically filtered intermediate sums and to perform horizontal cumulative summing of the vertically filtered intermediate sums to generate cumulative sums of counts that are also included in vertically filtered cumulative sums 240B.

Similar to determining the horizontal sharpness in a region of interest, one or more processors 110 may determine the horizontal count for a region of interest as the corresponding sums of such counts in the lower right corner sample of the region of interest in horizontally filtered cumulative sums 240A, minus the corresponding sums of such counts of the neighboring top right sample to the region of interest in horizontally filtered cumulative sums 240A, minus the corresponding sums of such counts of the neighboring bottom right sample to the region of interest in horizontally filtered cumulative sums 240A, plus the corresponding sums of such counts of the neighboring sample that is above and to the left of the region of interest in horizontally filtered cumulative sums 240A.

Similar to determining the vertical sharpness in a region of interest, one or more processors 110 may determine the vertical count for a region of interest as the corresponding sums of such counts in the lower right corner sample of the region of interest in vertically filtered cumulative sums 240B, minus the corresponding sums of such counts of the neighboring top right sample to the region of interest in vertically filtered cumulative sums 240B, minus the corresponding sums of such counts of the neighboring bottom right sample to the region of interest in vertically filtered cumulative sums 240B, plus the corresponding sums of such counts of the neighboring sample that is above and to the left of the region of interest in vertically filtered cumulative sums 240B.

Figure 3:
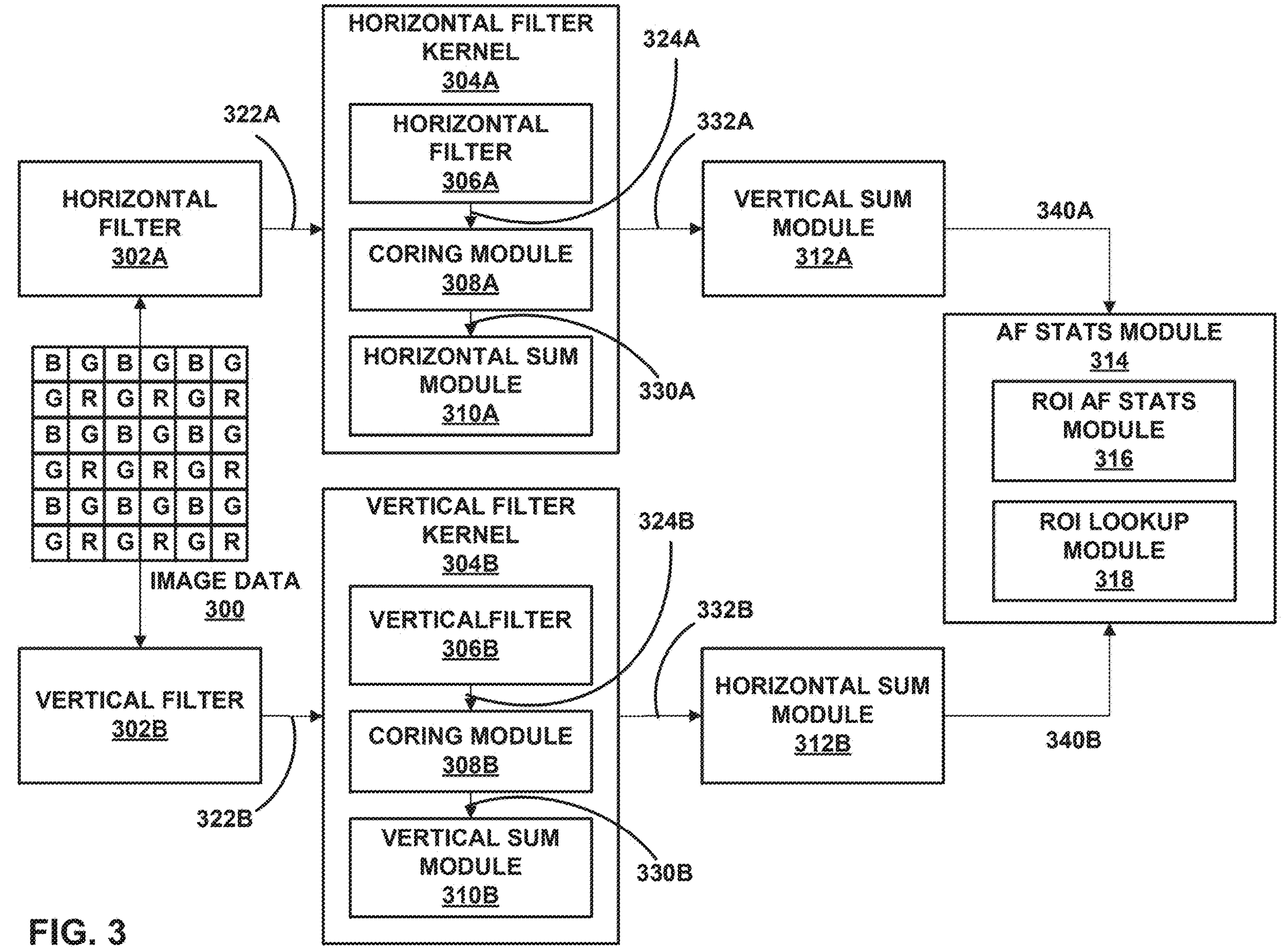
FIG. 3 is a flow diagram illustrating an example technique performed by one or more processors shown in FIG. 1 for parallel processing to determine autofocus statistics.

FIG. 3 is a flow diagram illustrating an example technique performed by one or more processors 110 shown in FIG. 1 for parallel processing to determine autofocus statistics. FIG. 3 is described with respect to FIGS. 1 and 2.

As shown in FIG. 3, one or more processors 110 may implement horizontal filter logic 202A of FIG. 2 as first horizontal filter 302A, second horizontal filter 306A, and coring module 308A. In the example of FIG. 3, the first horizontal filter 302A and the second horizontal filter 306A may each be a horizontal IIR biquad filter. In other examples, one or more of the first horizontal filter 302A and the second horizontal filter 306A may be other types of filters, such as a horizontal finite impulse response (FIR) filter.

One or more processors 110 may apply the first horizontal filter 302A to image data 300 to generate first horizontally filtered image data 322A. One or more processors 110 may apply the second horizontal filter 306A to the first horizontally filtered image data 322A to generate second horizontally filtered image data 324A. Applying the first horizontal filter 302A followed by applying the second horizontal filter 306A may enable one or more processors to reduce noise in the filtered image data. Further, the sequence of applying the first horizontal filter 302A followed by applying the second horizontal filter 306A may provide for more complex and precise frequency responses, which may allow for better control over the filtering characteristics. In some examples, image data 300 may be in a Bayer format.

One or more processors 110 may execute coring module 308A to perform coring of the second horizontally filtered image data 324A to generate cored horizontally filtered image data 330A. As described above, one or more processors 110 may perform coring to second horizontally filtered image data 324A to perform soft thresholding of the sharpness values of the samples that is the result of applying the one or more horizontal filters to image data 300. Performing soft thresholding of the sharpness values of the samples may deemphasize (e.g., set to zero) values lower than a specified threshold. Performing soft thresholding of the sharpness values of the samples may suppress small signal variations, which may sometimes be noise, while not affective larger features in the sharpness values.

One or more processors 110 may implement sum logic 220A of FIG. 2 as horizontal sum module 310A and vertical sum module 312A. One or more processors 110 may execute horizontal sum module 310A to determine horizontal cumulative sums of cored horizontally filtered image data 330A as intermediate horizontally filtered cumulative sums 332A. One or more processors 110 may execute vertical sum module 312A to determine vertical cumulative sums of intermediate horizontally filtered cumulative sums 332A as horizontally filtered cumulative sums 340A, which is also referred to as an accumulation matrix throughout this disclosure.

While FIG. 3 illustrates executing horizontal cumulative summing of cored horizontally filtered image data 330A prior to executing vertical cumulative summing to generate horizontally filtered cumulative sums 340A, one or more processors 110 may, in some examples, perform vertical cumulative summing of cored horizontally filtered image data 330A prior to performing horizontal cumulative summing to generate horizontally filtered cumulative sums 340A. For example, one or more processors 110 may execute vertical sum module 312A to determine vertical cumulative sums of cored horizontally filtered image data 330A as intermediate horizontally filtered cumulative sums 332A and may execute horizontal sum module 310A to determine horizontal cumulative sums of intermediate horizontally filtered cumulative sums 332A as horizontally filtered cumulative sums 340A. By determining vertical cumulative sums and horizontal cumulative sums of cored horizontally filtered image data 330A to generate horizontally filtered cumulative sums 340A, horizontally filtered cumulative sums 340A is therefore a summed-area table, also referred to as an integral image, of cored horizontally filtered image data 330A.

One or more processors 110 may implement vertical filter logic 202B of FIG. 2 as first vertical filter 302B, second vertical filter 306B, and coring module 308B. In the example of FIG. 3, the first vertical filter 302B and the second vertical filter 306B may each be a vertical IIR biquad filter. In other examples, one or more of the first vertical filter 302B and the second vertical filter 306B may be other types of filters, such as a horizontal finite impulse response (FIR) filter.

One or more processors 110 may apply the first vertical filter 302B to image data 300 that is in a Bayer format to generate first vertically filtered image data 322B. One or more processors 110 may apply the second vertical filter 306B to the first vertically filtered image data 322B to generate second vertically filtered image data 324B. Applying the first vertical filter 302B followed by applying the second vertical filter 306B may enable one or more processors to reduce noise in the filtered image data. Further, the sequence of applying the first vertical filter 302B followed by applying the second vertical filter 306B may provide for more complex and precise frequency responses, which may allow for better control over the filtering characteristics.

One or more processors 110 may execute coring module 308B to perform coring of the second vertically filtered image data 324B to generate cored vertically filtered image data 330B. As described above, one or more processors 110 may perform coring to second vertically filtered image data 324B to perform soft thresholding of the sharpness values of the samples that is the result of applying the one or more vertical filters to image data 300. Performing soft thresholding of the sharpness values of the samples may deemphasize (e.g., set to zero) values lower than a specified threshold.

Performing soft thresholding of the sharpness values of the samples may suppress small signal variations, which may sometimes be noise, while not affective larger features in the sharpness values.

One or more processors 110 may implement sum logic 220B of FIG. 2 as vertical sum module 310B and horizontal sum module 312B. One or more processors 110 may execute vertical sum module 310B to determine vertical cumulative sums of cored vertically filtered image data 330B as intermediate vertically filtered cumulative sums 332B. One or more processors 110 may execute horizontal sum module 312B to determine horizontal cumulative sums of intermediate vertically filtered cumulative sums 332B as vertically filtered cumulative sums 340B.

While FIG. 3 illustrates performing vertical cumulative summing of cored vertically filtered image data 330B prior to performing horizontal cumulative summing to generate vertically filtered cumulative sums 340B, one or more processors 110 may, in some examples, perform horizontal cumulative summing of cored vertically filtered image data 330B prior to performing vertical cumulative summing to generate vertically filtered cumulative sums 340B, which is also referred to as an accumulation matrix throughout this disclosure. For example, one or more processors 110 may execute horizontal sum module 312B to determine horizontal cumulative sums of cored vertically filtered image data 330B as intermediate vertically filtered cumulative sums 332B and may execute vertical sum module 310B to determine vertical cumulative sums of intermediate vertically filtered cumulative sums 332B as vertically filtered cumulative sums 340B. By determining vertical cumulative sums and horizontal cumulative sums of cored vertically filtered image data 330B to generate vertically filtered cumulative sums 340B, vertically filtered cumulative sums 340B is therefore a summed-area table, also referred to as an integral image, of cored vertically filtered image data 330B.

One or more processors 110 may implement autofocus statistics logic 214 of FIG. 2 as autofocus statistics module 314 that includes ROI autofocus statistics module 316 and ROI lookup module 318. One or more processors 110 may execute ROI autofocus statistics module 316 to determine, for a ROI in image data 300, autofocus statistics for the ROI, such as vertical sharpness, vertical sum, vertical count, horizontal sharpness, horizontal sum, and horizontal count. One or more processors 110 may determine ROI autofocus statistics for a plurality of different ROIs in image data and may store the determined autofocus statistics (e.g., in local memory 120 and/or system memory 130). One or more processors 110 may execute ROI lookup module 318 to, for a ROI, look up and retrieve the determined autofocus statistics from memory.

One or more processors 110 may be able to determine, for an ROI, autofocus statistics based on horizontally filtered cumulative sums 340A and vertically filtered cumulative sums 340B. For example, one or more processors 110 may determine the horizontal sharpness for a region of interest in image data 300 as the sum of sharpness values specified in horizontally filtered image data 330A within the region of interest, and may determine the sum of sharpness values specified in horizontally filtered image data 330A within the region of interest using the accumulated sums in horizontally filtered cumulative sums 340A.

Specifically, one or more processors 110 may determine the sum of sharpness values specified in horizontally filtered image data 330A within a region of interest as the corresponding value of the lower right corner sample of the region of interest in horizontally filtered cumulative sums 340A, minus the corresponding value of the neighboring top right sample to the region of interest in horizontally filtered cumulative sums 340A, minus the corresponding value of the neighboring bottom right sample to the region of interest in horizontally filtered cumulative sums 340A, plus the corresponding value of the neighboring sample that is above and to the left of the region of interest in horizontally filtered cumulative sums 340A.

One or more processors 110 may be able to determine the horizontal sharpness for a region of interest of any size based on the values of these four samples in horizontally filtered cumulative sums 340A, enabling one or more processors 110 to determine the horizontal sharpness for a region of interest in constant time regardless of the size of the region of interest. This technique for determining the horizontal sharpness for a region of interest is described in further detail with respect to FIGS. 4A-4D.

One or more processors 110 may determine the vertical sharpness for a region of interest in image data 300 as the sum of sharpness values specified in vertically filtered image data 330B within the region of interest, and may determine the sum of sharpness values specified in vertically filtered image data 330B within the region of interest using the accumulated sums in vertically filtered cumulative sums 340B.

Specifically, one or more processors 110 may determine the sum of sharpness values specified in vertically filtered image data 330B within a region of interest as the corresponding value of the lower right corner sample of the region of interest in vertically filtered cumulative sums 340B, minus the corresponding value of the neighboring top right sample to the region of interest in vertically filtered cumulative sums 340B, minus the corresponding value of the neighboring bottom right sample to the region of interest in vertically filtered cumulative sums 340B, plus the corresponding value of the neighboring sample that is above and to the left of the region of interest in vertically filtered cumulative sums 340B.

One or more processors 110 may be able to determine the vertical sharpness for a region of interest of any size based on the values of these four samples in vertically filtered cumulative sums 340B, enabling one or more processors 110 to determine the vertical sharpness for a region of interest in constant time regardless of the size of the region of interest. This technique for determining the vertical sharpness for a region of interest is described in further detail with respect to FIGS. 4A-4D.

One or more processors 110 may utilize multithreading and/or parallel processing to perform the operations described with respect to the logic and modules of FIG. 3. That is, the modules of FIG. 3 may execute on separate threads that run concurrently on one or more processors 110 or may execute on multiple processors and/or processing cores of one or more processors 110. Taking advantage of multithreading and/or parallel processing features of one or more processors 110 may enable one or more processors 110 to more quickly determine autofocus statistics.

In the example of FIG. 3, first horizontal filter 302A and first vertical filter 302B may each be implemented to run as separate threads and/or separate processes that one or more processors 110 may concurrently execute. Concurrently executing first horizontal filter 302A and first vertical filter 302B may include one or more processors 110 performing one or more operations of first horizontal filter 302A while performing (e.g., on another processing core) one or more operations of first vertical filter 302B.

Second horizontal filter 306A coring module 308A, and horizontal sum module 310A may be grouped as horizontal filter kernel 304A that may run as a separate thread and/or a separate process. Similarly, second vertical filter 306B coring module 308B, and vertical sum module 310B may be grouped as vertical filter kernel 304B that may run as a separate thread and/or a separate process. Vertical sum module 312A and horizontal sum module 312B may also be implanted to run as separate threads and/or separate processes that one or more processors 110 is able to concurrently execute. In this way, one or more processors 110 may be able to concurrently execute any combination of first horizontal filter 302A, first vertical filter 302B, horizontal filter kernel 304A, vertical filter kernel 304B, vertical sum module 312A, and horizontal sum module 312B.

Similarly, one or more processors 110 may implement AF statistics module 314 to utilize multithreading and/or parallel processing to be able to concurrently determine autofocus statistics for regions of interest in image data 300. One or more processors 110 may determine multiple autofocus statistics (e.g., vertical sharpness, horizontal sharpness, vertical sum, horizontal sum, vertical count, and/or horizontal count) in parallel using multithreading and/or parallel processing. One or more processors 110 may also determine multiple autofocus statistics for each of multiple ROIs in parallel using multithreading and/or parallel processing.

FIGS. 4A-4D are conceptual diagrams illustrating techniques for determining autofocus statistics using accumulation matrices for filtered image data, according to the techniques of this disclosure. FIGS. 4A-4D are described with respect to FIGS. 1-3.

Filtered image data 430 may be a result of applying one or more horizontal filters or one or more vertical filters to image data in a Bayer format, and may be an example of horizontally filtered image data 230A of FIG. 2, vertically filtered image data 230B of FIG. 2, cored horizontally filtered image data 330A of FIG. 3, or cored vertically filtered image data 330B of FIG. 3. Filtered image data 430 may have the same dimensions as the image data in the Bayer format that was filtered to produce filtered image data 430. Because filtered image data 430 is a 6×5 matrix of sample values in the example of FIGS. 4A-4D, filtered image data 430 may be a result of filtering image data having a dimension of 6×5.

One or more processors 110 may determine, from filtered image data 430, an accumulation matrix for filtered image data 430. In some examples, one or more processors 110 may determine a summed-area table, also referred to as an integral table, of filtered image data 430 as the accumulation matrix for filtered image data 430. Such an accumulation matrix for filtered image data 430 is shown as filtered cumulative sums 440. Filtered cumulative sums 440 may be an example of horizontally filtered cumulative sums 240A of FIG. 2, vertically filtered cumulative sums 240B of FIG. 2, horizontally filtered cumulative sums 340A of FIG. 3, or vertically filtered cumulative sums 340B of FIG. 3.

Figure 4A:
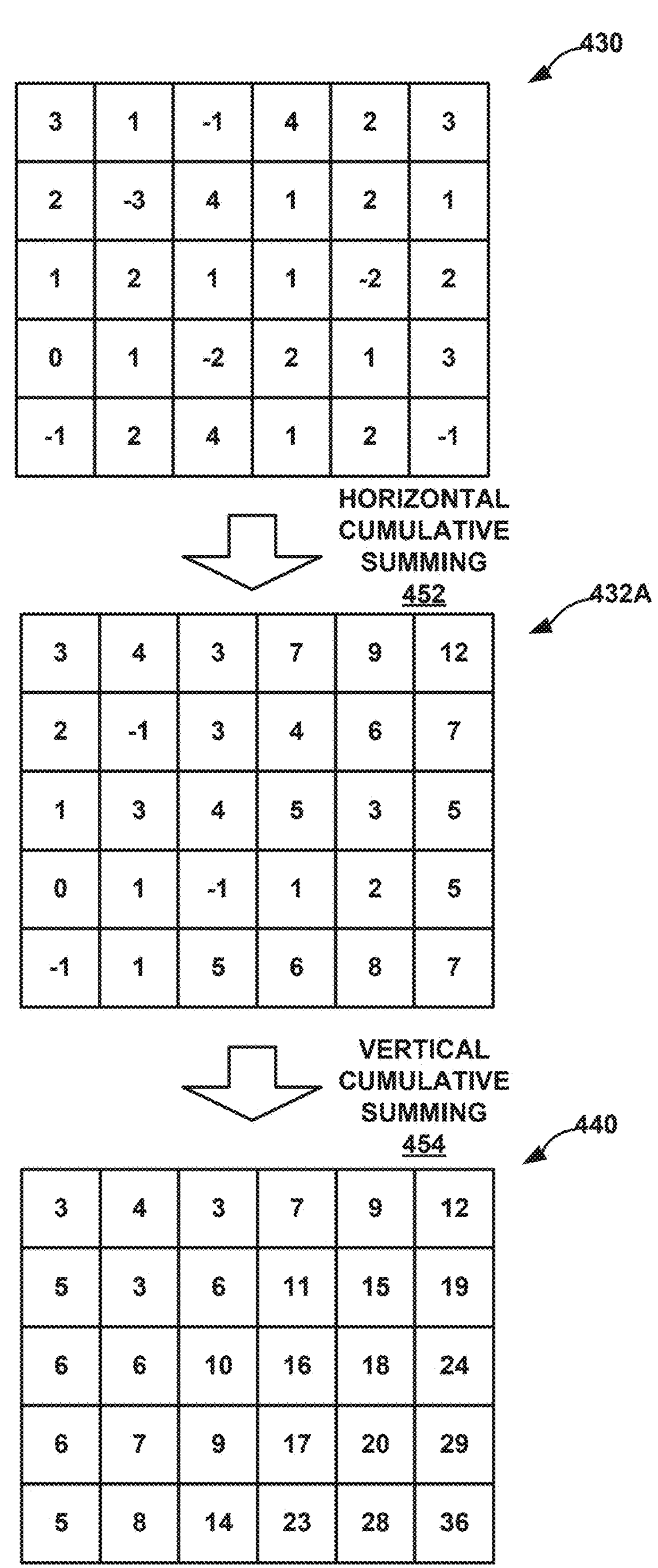
FIGS. 4A-4D are conceptual diagrams illustrating techniques for determining autofocus statistics using an accumulation matrix for filtered image data, according to the techniques of this disclosure.

As shown in FIG. 4A, one or more processors may generate filtered cumulative sums 440 for filtered image data 430 by performing horizontal cumulative summing 452 of filtered image data 430 to produce intermediate filtered cumulative sums 432A and by performing vertical cumulative summing 454 of intermediate filtered cumulative sums 432A to produce filtered cumulative sums 440 for filtered image data 430. To perform horizontal cumulative summing 452 of filtered image data 430, one or more processors 110 may, for each sample value in a row, determine an output sample value that is the cumulative sum of the sample value and previous sample values in the row. For example, given the first row of sample values [3 1 −1 4 2 3] in filtered image data 430, horizontal cumulative summing of the row may produce a corresponding first row of output sample values of [3 4 3 7 9 12] in intermediate filtered cumulative sums 432A.

To perform vertical cumulative summing 454 of intermediate filtered cumulative sums 432A to produce filtered cumulative sums 440, one or more processors 110 may, for each sample value in a column, determine an output sample value that is the cumulative sum of the sample value and previous sample values in the column. For example, given the first column of sample values [3 2 1 0 −1] in intermediate filtered cumulative sums 432A, vertical cumulative summing of the column may produce a corresponding first column of output sample values of [3 5 6 6 5] in filtered cumulative sums 440.

Figure 4B:
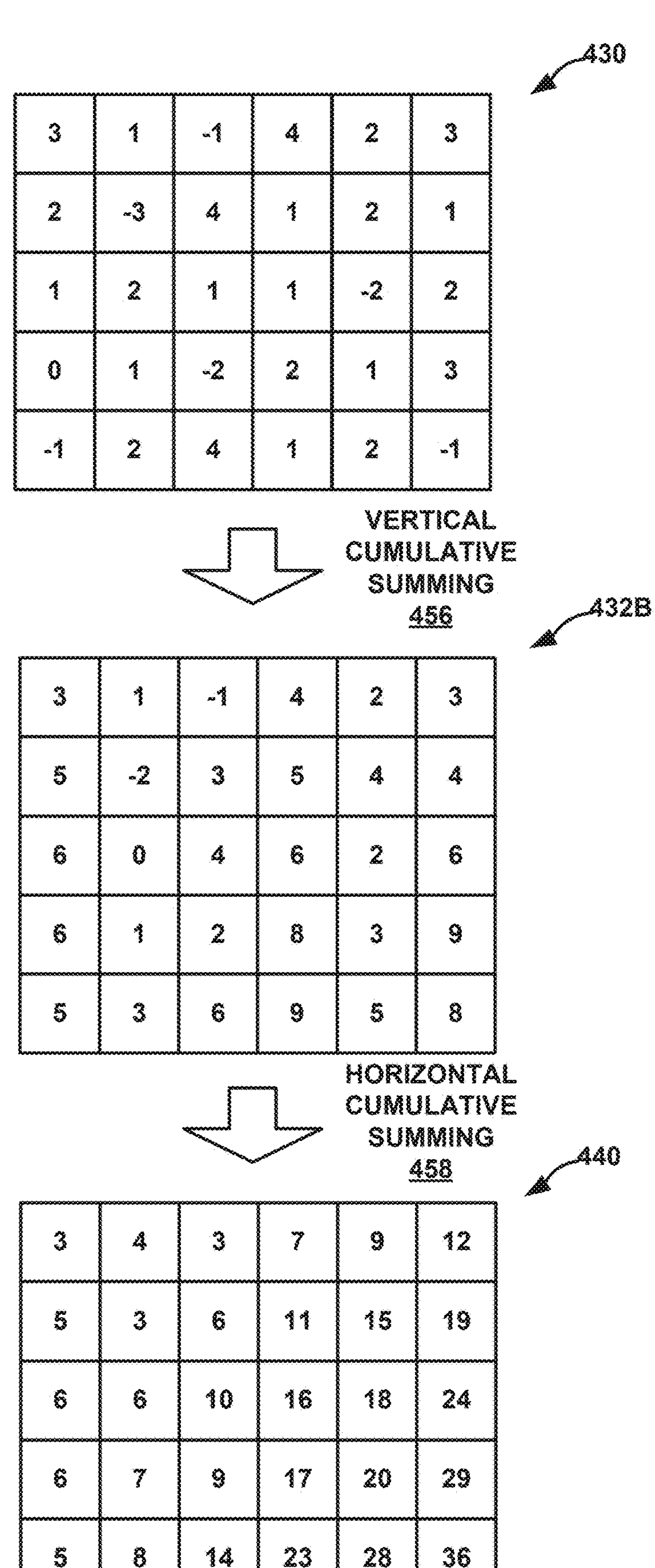

As shown in FIG. 4B, one or more processors may generate filtered cumulative sums 440 for filtered image data 430 by performing vertical cumulative summing 456 of filtered image data 430 to produce intermediate filtered cumulative sums 432B and by performing horizontal cumulative summing 458 of intermediate filtered cumulative sums 432B to produce filtered cumulative sums 440 for filtered image data 430. As can be seen in the examples of FIGS. 4A and 4B, one or more processors 110 may generate filtered cumulative sums 440 for filtered image data 430 by performing vertical cumulative summing followed by performing horizontal cumulative summing, or by performing horizontal cumulative summing followed by performing vertical cumulative summing.

Figure 4C:
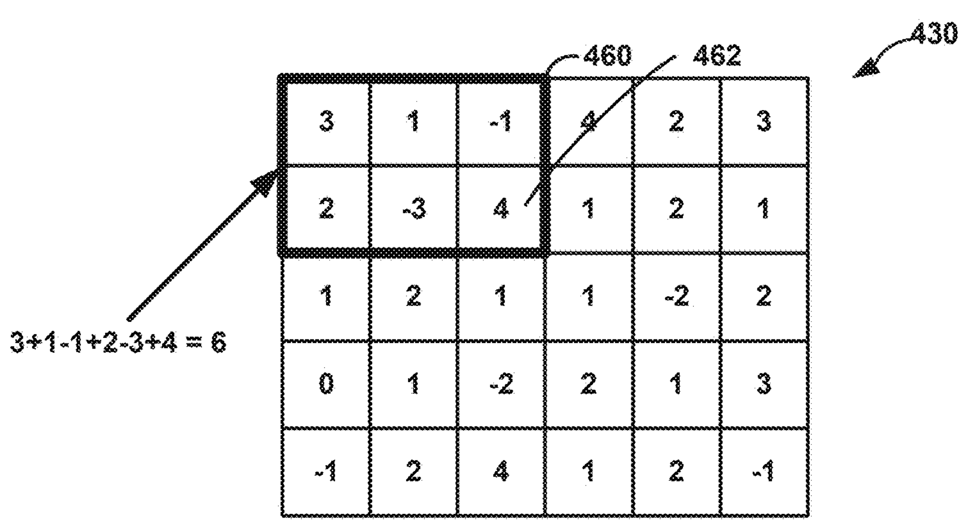
Figure 4C:
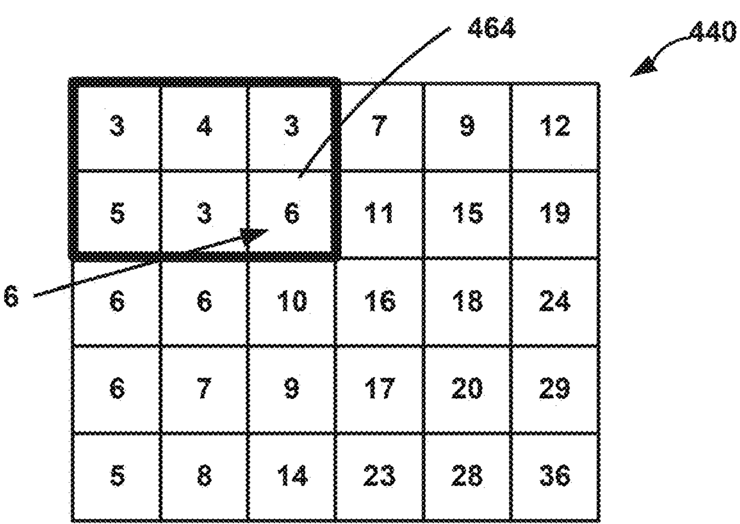

One or more processors 110 may use the sample values in filtered cumulative sums 440 to determine a sum of sample values within a region of interest in filtered image data 430. As shown in FIG. 4C, region of interest 460A in filtered image data 430 is a top-left 3×2 region of filtered image data 430 containing sample values of 3, 1, −1, 2, −3, 4, and where the sum of sample values in region of interest 460A is 3+1−1+2−3+4=6.

A region of interest in filtered image data, such as filtered image data 430, may be the same as a corresponding region of interest in image data (e.g., image data 300) prior to filtering, because both regions of interest encompasses the same set of samples, with the filtered image data and the image data prior to filtering having different samples. Thus, a region of interest in filtered image data 430, such as region of interest 460A, may encompass the same sample locations (e.g., a top-left 3×2 region) as a corresponding region of interest in the image data prior to filtering.

Filtered cumulative sums 440 may be a summed-area table of filtered image data 430. As such, the sample value of any sample at location (x, y) in filtered cumulative sums 440 is the sum of all sample values above and to the left of location (x, y), inclusive, in filtered image data 430. Thus, given region of interest 460 in filtered image data 430 is a rectangular region that encompasses an entire top-left region of six samples in filtered image data 430, one or more processors 110 may determine the sum of sample of values in region of interest 460 to be the sample value of a sample at a location in filtered cumulative sums 440 that corresponds to the bottom-right sample 462 of region of interest 460.

As can be seen, sample 464 of filtered cumulative sums 440 is at a location within filtered cumulative sums 440 that corresponds to the location of bottom-right sample 462 of region of interest 460 in filtered image data 430. Sample 464 has a sample of value of 6, which is equal to the sum of sample values in region of interest 460A (i.e., 3+1−1+2−3+4=6). In this way, one or more processors 110 may use the sample values in filtered cumulative sums 440 to determine a sum of sample values within a region of interest in filtered image data 430.

Figure 4D:
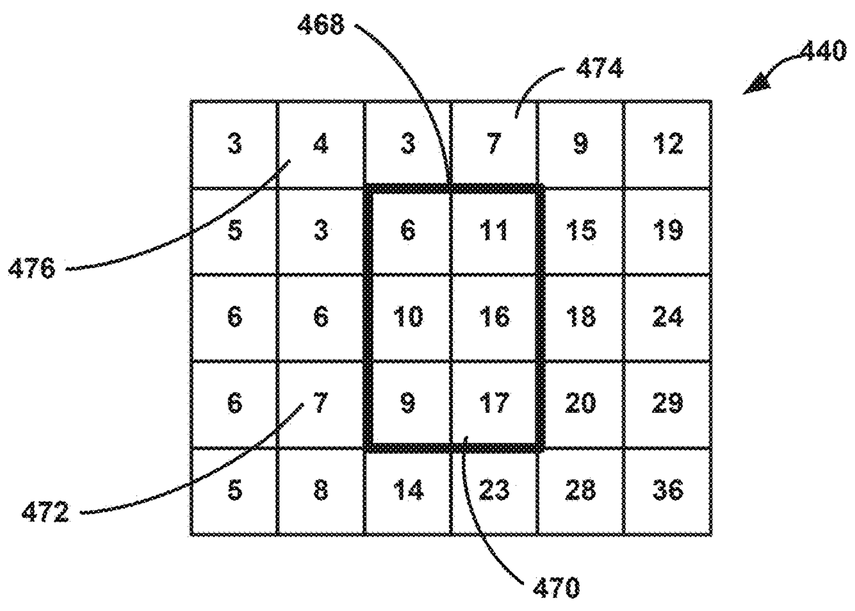

Even if a region of interest in filtered image data 430 is not a top-left region of filtered image data 430, one or more processors 110 may still be able to use the sample values in filtered cumulative sums 440 to determine a sum of sample values within a region of interest in filtered image data 430. As shown in FIG. 4D, region of interest 466 in filtered image data 430 does not encompass a top-left region of filtered image data 430.

One or more processors 110 may determine the sum of sample values within a region of interest, such as region of interest 466, using four sample values at specific locations in filtered cumulative sum 440 relative to the corresponding location of the region of interest. In the example of region of interest 466, one or more processors 110 may determine the sum of sample values within region of interest 466 in filtered image data 430 as the sample value of sample 470 at a location in filtered cumulative sums 440 that corresponds to the lower right corner sample of region of interest 468 minus the sample value of sample 472 at a location in filtered cumulative sums 440 that corresponds to the neighboring bottom left sample of region of interest 468 minus the sample value of sample 474 at a location in filtered cumulative sums 440 that corresponds to the neighboring top right sample of region of interest 468 plus the sample value 476 at a location in filtered cumulative sums 440 that corresponds to a neighboring sample that is to the left and top of region of interest 468.

In this way, one or more processors 110 may be able to, for regions of interest of any size within filtered image data, determine the sum of sample values within the region of interest using sample values of four samples at specific corresponding locations of the filtered cumulative sums that is a summed-area table of the filtered image data. Such a technique may enable one or more processors 110 to determine such sums in constant time, which may increase the speed at which one or more processors 110 are able to determine such sums.

Figure 5:
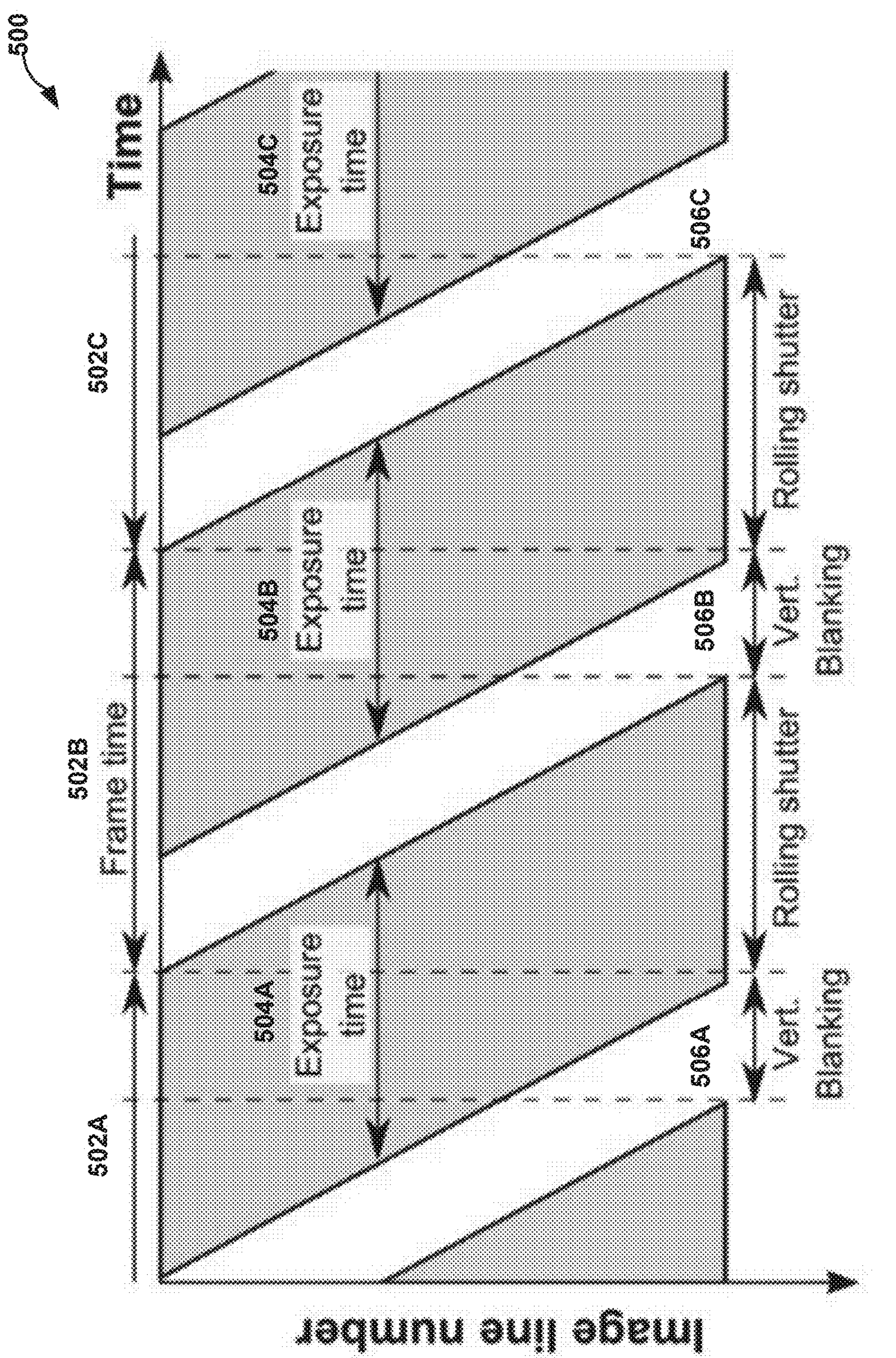
FIG. 5 is a conceptual diagram illustrating an example timing sequence of a rolling shutter mechanism for a camera, according to aspects of this disclosure.

FIG. 5 is a conceptual diagram illustrating an example timing sequence of a rolling shutter mechanism for camera 102, according to aspects of this disclosure. As shown in FIG. 5, graph 500 plots lines of pixels in the image sensor that are exposed to light over time. In graph 500, each of frame times 502A-502C is a duration for one complete frame capture. Each of exposure times 504A-504C is a time during which the camera sensor is exposed to light to capture an image. During each of exposure times 504A-504C, each line of the sensor is exposed to light for a specific exposure time.

Vertical blanking intervals 506A-506C are intervals between frames where no image data is captured. In the example of camera 102 that captures 30 frames per second of images, each of frame times 502A-502C may have a duration of 33 milliseconds, each of exposure times 504A-504C may have a duration of 10 milliseconds. Thus, each of vertical blanking intervals 506A-506C may have a duration of 23 milliseconds.

One or more processors 110 may perform the techniques of this disclosure to determine autofocus statistics for camera 102 during each of vertical blanking intervals 506A-506C. Because the techniques of this disclosure enables one or more processors 110 to more quickly determine autofocus statistics for camera 102, one or more processors 110 may be able to determine autofocus statistics for camera 102 during a vertical blanking interval, which in the example of FIG. 5, may be 23 milliseconds. Being able to determine autofocus statistics for camera 102 during a vertical blanking interval may enable camera 102 to quickly adjust its lens position in time for the next exposure time after the vertical blanking interval and to therefore be able to more quickly focus the lens of camera 102.

Figure 6:
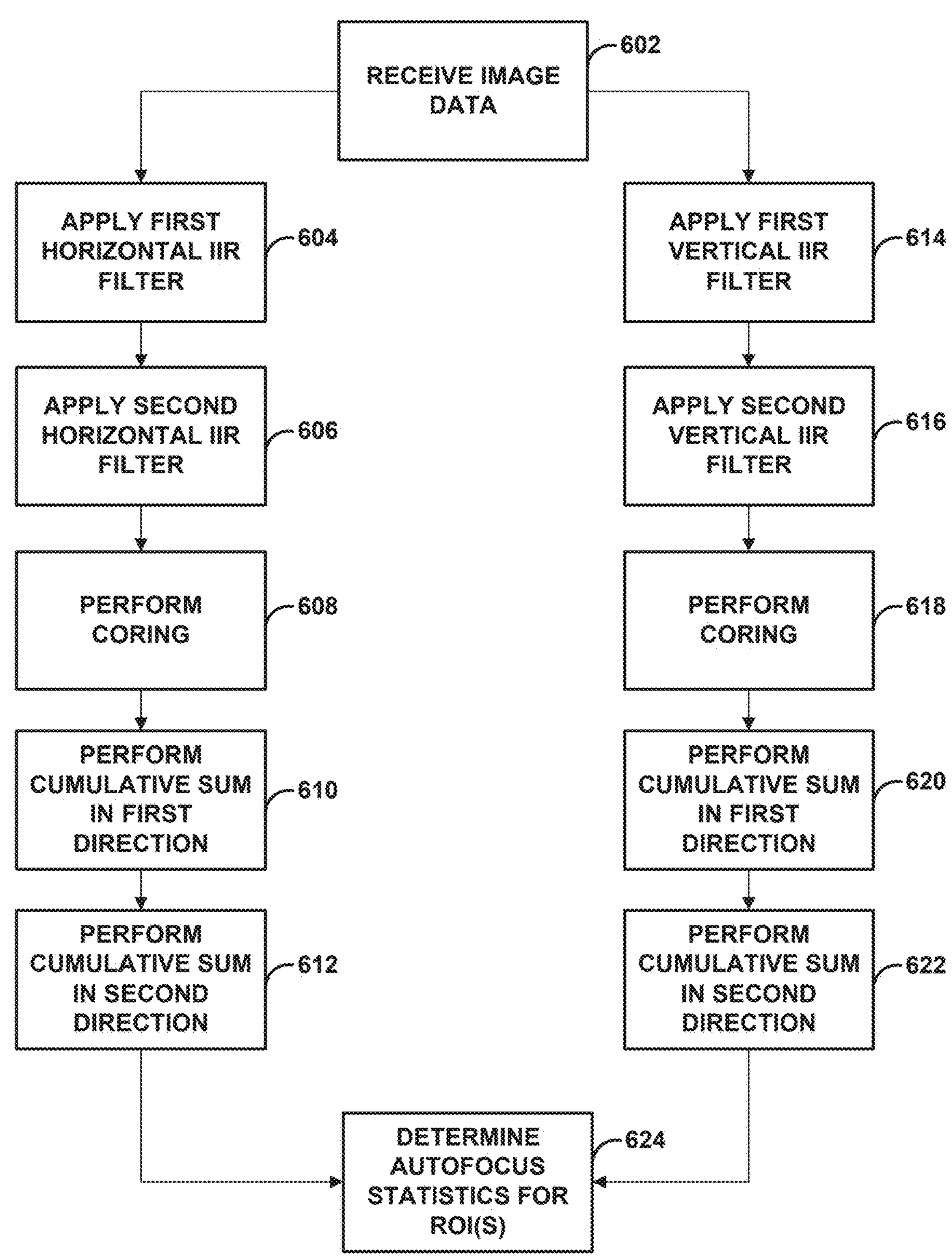
FIG. 6 is a flowchart illustrating an example process for determining autofocus statistics for a camera, according to the techniques of this disclosure.

FIG. 6 is a flowchart illustrating an example process for determining autofocus statistics for camera 102, according to the techniques of this disclosure. FIG. 6 is described with respect to FIG. 1.

As shown in FIG. 6, one or more processors 110 may receive image data in a Bayer format (602). The image data may be a camera frame captured by camera 102. One or more processors 110 may obtain the image data via a Bayer sensor of camera 102, or may obtain the image data from memory.

One or more processors 110 may perform first horizontal filtering of the image data to produce a first horizontally filtered image data (604). For example, one or more processors 110 may apply a first horizontal IIR biquad filter to the image data to produce the first horizontally filtered image data.

One or more processors 110 may perform second horizontal filtering of the first horizontally filtered image data to produce a second horizontally filtered image data (606). For example, one or more processors 110 may apply a second horizontal IIR biquad filter to the first horizontally filtered image data to produce the second horizontally filtered image data.

One or more processors 110 may performed coring of the second horizontally filtered image data to produce cored horizontally filtered image data (608). For example, one or more processors 110 may apply soft thresholding to the sharpness values of the samples in the second horizontally filtered image data.

One or more processors 110 may perform cumulative summing of the cored horizontally filtered image data in a first direction, such as vertical cumulative summing or horizontal cumulative summing of the cored horizontally filtered image data, to produce intermediate horizontally filtered cumulative sums (610). One or more processors 110 may perform cumulative summing of the intermediate horizontally filtered cumulative sums in a second direction to produce horizontally filtered cumulative sums (612). For example, if one or more processors 110 performed vertical cumulative summing of the cored horizontally filtered image data to produce intermediate horizontally filtered cumulative sums, one or more processors 110 may perform horizontal cumulative summing of the intermediate horizontally filtered cumulative sums to produce horizontally filtered cumulative sums. Similarly, if one or more processors 110 performed horizontal cumulative summing of the cored horizontally filtered image data to produce intermediate horizontally filtered cumulative sums, one or more processors 110 may perform vertical cumulative summing of the intermediate horizontally filtered cumulative sums to produce horizontally filtered cumulative sums.

One or more processors 110 may also perform first vertical filtering of the image data to produce a first vertically filtered image data (614). For example, one or more processors 110 may apply a first vertical IIR biquad filter to the image data to produce the first vertically filtered image data.

One or more processors 110 may perform second vertical filtering of the first vertically filtered image data to produce a second vertically filtered image data (616). For example, one or more processors 110 may apply a second vertical IIR biquad filter to the first vertically filtered image data to produce the second vertically filtered image data.

One or more processors 110 may performed coring of the second vertically filtered image data to produce cored vertically filtered image data (618). For example, one or more processors 110 may apply soft thresholding to the sharpness values of the samples in the second vertically filtered image data.

One or more processors 110 may perform cumulative summing of the cored vertically filtered image data in a first direction, such as vertical cumulative summing or horizontal cumulative summing of the cored vertically filtered image data, to produce intermediate vertically filtered cumulative sums (620). One or more processors 110 may perform cumulative summing of the intermediate vertically filtered cumulative sums in a second direction to produce vertically filtered cumulative sums (622). For example, if one or more processors 110 performed vertical cumulative summing of the cored vertically filtered image data to produce intermediate vertically filtered cumulative sums, one or more processors 110 may perform horizontal cumulative summing of the intermediate vertically filtered cumulative sums to produce vertically filtered cumulative sums. Similarly, if one or more processors 110 performed horizontal cumulative summing of the cored vertically filtered image data to produce intermediate vertically filtered cumulative sums, one or more processors 110 may perform vertical cumulative summing of the intermediate vertically filtered cumulative sums to produce vertically filtered cumulative sums.

One or more processors 110 may determine autofocus statistics for one or more regions of interest based on the horizontally filtered cumulative sums and the vertically filtered cumulative sums (624). For example, one or more processors 110 may determine, for a region of interest, a horizontal sharpness based on the horizontally filtered cumulative sums and may determine, for the region of interest, a vertical sharpness based on the vertically filtered cumulative sums.

One or more processors 110 may concurrently perform one or more operations of any of the steps of the technique described in FIG. 6. For example, one or more processors 110 may concurrently perform one or more operations of horizontal filtering of image data and one or more operations of vertical filtering of image data. One or more processors 110 may also concurrently determine multiple autofocus statistics of multiple regions of interest.

Figure 7:
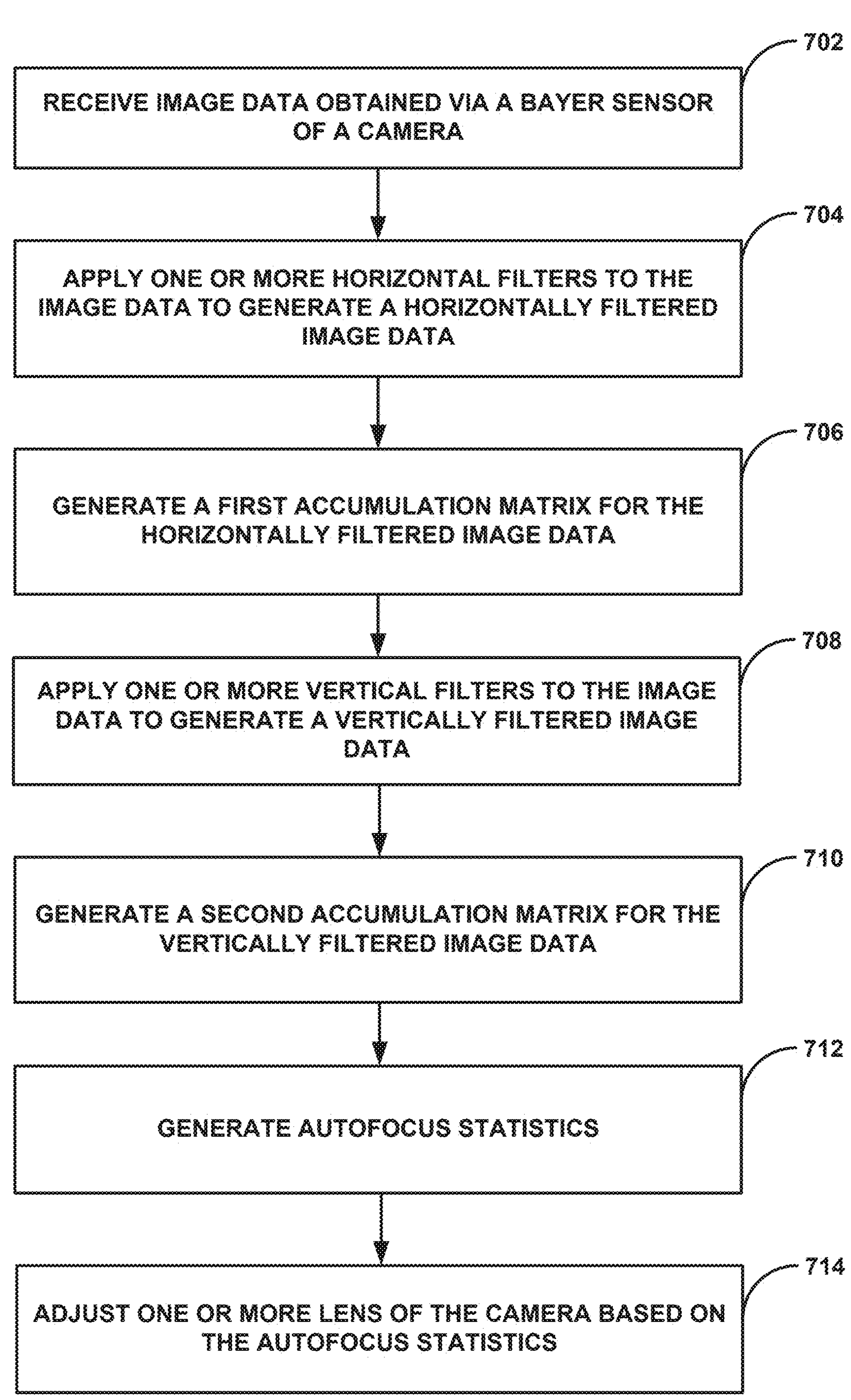
FIG. 7 is a flowchart showing an example method of operation according to the techniques of this disclosure.

FIG. 7 is a flowchart showing an example method of operation according to the techniques of this disclosure. For ease, the example is described with respect to FIGS. 1-3.

As shown in FIG. 7, one or more processors 110 may receive image data obtained via an image sensor of a camera 102 (702). In some examples, such image data 300 may be a camera frame captured by camera 102 in the Bayer format, such as image data obtained via a Bayer sensor of the camera 102.

One or more processors 110 may apply one or more horizontal filters to the image data 300 to generate horizontally filtered image data (704). In some examples, the one or more horizontal filters include one or more horizontal infinite impulse response (IIR) filters. In some examples, to apply the one or more horizontal filters to the image data, one or more processors 110 may apply a first horizontal IIR filter to the image data 300 to generate a first horizontally filtered image data 322A, apply a second horizontal IIR filter to the first horizontally filtered image data 322A to generate a second horizontally filtered image data 324A, and generating the horizontally filtered image data 330A based on second horizontally filtered image data 324A.

One or more processors 110 apply one or more vertical filters to the image data to generate vertically filtered image data (706). In some examples, the one or more vertical filters comprise one or more vertical IIR filters. In some examples, to apply the one or more vertical filters to the image data 300, one or more processors 110 may apply a first vertical IIR filter to the image data 300 to generate a first vertically filtered image data 322B, apply a second vertical IIR filter to the first vertically filtered image data 322B to generate a second vertically filtered image data 324B, and generating the vertically filtered image data 330B based on second vertically filtered image data 324B.

In some examples, one or more processors 110 may concurrently perform one or more operations of applying the one or more horizontal filters to the image data 300 and one or more operations of applying the one or more vertical filters to the image data 300. In some examples, to concurrently perform the one or more operations of applying the one or more horizontal filters to the image data 300 and performing the one or more operations of applying the one or more vertical filters to the image data 300, one or more processors 110 may concurrently perform one or more operations of applying the first horizontal IIR filter to the image data 300 and one or more operations of applying the first vertical IIR filter to the image data 300.

In some examples, to concurrently perform the one or more operations of applying the one or more horizontal filters to the image data 300 and performing the one or more operations of applying the one or more vertical filters to the image data 300, one or more processors 110 may concurrently perform one or more operations of applying the second horizontal IIR filter and generating cored horizontally filtered image data 330A, and one or more operations of applying the second vertical IIR filter and generating cored vertically filtered image data 330B.

One or more processors 110 may generate a first accumulation matrix for the horizontally filtered image data (708). One or more processors 110 may generate a second accumulation matrix for the vertically filtered image data (710).

One or more processors 110 may determine autofocus based on the first accumulation matrix and the second accumulation matrix (712). In some examples, the autofocus statistics comprise a vertical sharpness for a region of interest in image data 300 and a horizontal sharpness for the region of interest. In some examples, to determine the autofocus statistics based on the first accumulation matrix and the second accumulation matrix, one or more processors 110 may determine, based on the first accumulation matrix, the horizontal sharpness for the region of interest as a sum of sharpness values in the region of interest and may determine, based on the second accumulation matrix, the vertical sharpness for the region of interest as a sum of sharpness values in the region of interest.

In some examples, to determine the horizontal sharpness for the region of interest and determining the vertical sharpness for the region of interest, one or more processors 110 may concurrently determine the horizontal sharpness for the region of interest and the vertical sharpness for the region of interest. In some examples, to determine the autofocus statistics for the region of interest in the image data based on the first accumulation matrix and the second accumulation matrix, one or more processors 110 may concurrently determine, for each of a plurality of regions of interest in the image data 300, a corresponding vertical sharpness and a corresponding horizontal sharpness.

One or more processors 110 may output information to adjust one or more lenses of the camera based on the autofocus statistics (714). For example, one or more processors 110 may output such information, such as the autofocus statistics and/or instructions to adjust the one or more lenses, to camera 102.

The following describes other example aspects of the disclosure. The techniques of the following aspects may be used separately or in any combination.

Clause 1. A computing device comprising: one or more memories configured to store image data obtained via an image sensor of a camera; and one or more processors implemented in circuitry, coupled to the one or more memories, and configured to: apply one or more horizontal filters to the image data to generate horizontally filtered image data; apply one or more vertical filters to the image data to generate vertically filtered image data; generate a first accumulation matrix for the horizontally filtered image data; generate a second accumulation matrix for the vertically filtered image data; determine autofocus statistics based on the first accumulation matrix and the second accumulation matrix; and output information to adjust one or more lenses of the camera based on the autofocus statistics.

Clause 2. The computing device of clause 1, wherein the one or more horizontal filters comprise one or more horizontal infinite impulse response (IIR) filters, and wherein the one or more vertical filters comprise one or more vertical IIR filters.

Clause 3. The computing device of clause 2, wherein to apply the one or more horizontal filters to the image data, the one or more processors are further configured to: apply a first horizontal IIR filter to the image data to generate a first horizontally filtered image data; apply a second horizontal IIR filter to the first horizontally filtered image data to generate a second horizontally filtered image data; and generate the horizontally filtered image data based on the second horizontally filtered image data.

Clause 4. The computing device of clause 3, wherein to apply the one or more vertical filters to the image data, the one or more processors are further configured to: apply a first vertical IIR filter to the image data to generate a first vertically filtered image data; apply a second vertical IIR filter to the first vertically filtered image data to generate a second vertically filtered image data; and generate the vertically filtered image data based on the second vertically filtered image data.

Clause 5. The computing device of clause 4, wherein the one or more processors are further configured to: concurrently perform one or more operations of applying the one or more horizontal filters to the image data and one or more operations of applying the one or more vertical filters to the image data.

Clause 6. The computing device of clause 5, wherein to concurrently perform the one or more operations of applying the one or more horizontal filters to the image data and performing the one or more operations of applying the one or more vertical filters to the image data, the one or more processors are further configured to: concurrently perform one or more operations of applying the first horizontal IIR filter to the image data and one or more operations of applying the first vertical IIR filter to the image data.

Clause 7. The computing device of any of clauses 5 and 6, wherein to concurrently perform the one or more operations of applying the one or more horizontal filters to the image data and the one or more operations of applying the one or more vertical filters to the image data, the one or more processors are further configured to: concurrently perform one or more operations of applying the second horizontal IIR filter and generating the horizontally filtered image data, and one or more operations of applying the second vertical IIR filter and generating the vertically filtered image data.

Clause 8. The computing device of any of clauses 1-7, wherein the autofocus statistics comprise a vertical sharpness for a region of interest and a horizontal sharpness for the region of interest, and wherein to determine the autofocus statistics for the region of interest in the image data based on the first accumulation matrix and the second accumulation matrix, the one or more processors are further configured to: determine, based on the first accumulation matrix, the horizontal sharpness for the region of interest as a sum of sharpness values in the region of interest; and determine, based on the second accumulation matrix, the vertical sharpness for the region of interest as a sum of sharpness values in the region of interest.

Clause 9. The computing device of clause 8, wherein to determine the horizontal sharpness for the region of interest and determining the vertical sharpness for the region of interest, the one or more processors are further configured to: concurrently determine the horizontal sharpness for the region of interest and the vertical sharpness for the region of interest.

Clause 10. The computing device of any of clauses 1-9, wherein to determine the autofocus statistics for the region of interest in the image data based on the first summed-area table and the second summed-area table, the one or more processors are further configured to: concurrently determine, for each of a plurality of regions of interest in the image data, a corresponding vertical sharpness and a corresponding horizontal sharpness.

Clause 11. A method comprising: receiving image data obtained via an image sensor of a camera; applying one or more horizontal filters to the image data to generate horizontally filtered image data; applying one or more vertical filters to the image data to generate vertically filtered image data; generating a first accumulation matrix for the horizontally filtered image data; generating a second accumulation matrix for the vertically filtered image data; determining autofocus statistics based on the first accumulation matrix and the second accumulation matrix; and output information to adjust one or more lenses of the camera based on the autofocus statistics.

Clause 12. The method of clause 11, wherein the one or more horizontal filters comprise one or more horizontal infinite impulse response (IIR) filters, and wherein the one or more vertical filters comprise one or more vertical IIR filters.

Clause 13. The method of clause 12, wherein applying the one or more horizontal filters to the image data further comprises: applying a first horizontal IIR filter to the image data to generate a first horizontally filtered image data; applying a second horizontal IIR filter to the first horizontally filtered image data to generate a second horizontally filtered image data; and generating the horizontally filtered image data based on the second horizontally filtered image data.

Clause 14. The method of clause 13, wherein applying the one or more vertical filters to the image data further comprises: applying a first vertical IIR filter to the image data to generate a first vertically filtered image data; applying a second vertical IIR filter to the first vertically filtered image data to generate a second vertically filtered image data; and generating the vertically filtered image data based on the second vertically filtered image data.

Clause 15. The method of clause 14, further comprising: concurrently performing one or more operations of applying the one or more horizontal filters to the image data and one or more operations of applying the one or more vertical filters to the image data.

Clause 16. The method of clause 15, wherein concurrently performing the one or more operations of applying the one or more horizontal filters to the image data and the one or more operations of applying the one or more vertical filters to the image data further comprises: concurrently performing one or more operations of applying the first horizontal IIR filter to the image data and one or more operations of applying the first vertical IIR filter to the image data.

Clause 17. The method of any of clauses 15 and 16, wherein concurrently performing the one or more operations of applying the one or more horizontal filters to the image data and performing the one or more operations of applying the one or more vertical filters to the image data further comprises: concurrently performing one or more operations of applying the second horizontal IIR filter and generating the horizontally filtered image data, and one or more operations of applying the second vertical IIR filter and generating the vertically filtered image data.

Clause 18. The method of any of clauses 11-17, wherein the autofocus statistics for the region of interest in the image data comprise a vertical sharpness for a region of interest and a horizontal sharpness for the region of interest, and wherein determining the autofocus statistics for the region of interest in the image data based on the first accumulation matrix and the second accumulation matrix further comprises: determining, based on the first accumulation matrix, the horizontal sharpness for the region of interest as a sum of sharpness values in the region of interest; and determining, based on the second accumulation matrix, the vertical sharpness for the region of interest as a sum of sharpness values in the region of interest.

Clause 19. The method of clause 18, wherein determining the horizontal sharpness for the region of interest and determining the vertical sharpness for the region of interest further comprises: concurrently determining the horizontal sharpness for the region of interest and the vertical sharpness for the region of interest.

Clause 20. A computer-readable storage medium storing instructions thereon that when executed cause one or more processors to: receive image data obtained via an image sensor of a camera; apply one or more horizontal filters to the image data to generate horizontally filtered image data; apply one or more vertical filters to the image data to generate vertically filtered image data; generate a first accumulation matrix for the horizontally filtered image data; generate a second accumulation matrix for the vertically filtered image data; determine autofocus statistics based on the first accumulation matrix and the second accumulation matrix; and output information to adjust one or more lenses of the camera based on the autofocus statistics.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A computing device comprising:

one or more memories configured to store image data obtained via an image sensor of a camera; and one or more processors implemented in circuitry, coupled to the one or more memories, and configured to:

concurrently apply one or more horizontal filters to the image data to generate horizontally filtered image data and one or more vertical filters to the image data to generate vertically filtered image data;

generate a first accumulation matrix for the horizontally filtered image data;

generate a second accumulation matrix for the vertically filtered image data;

determine autofocus statistics based on the first accumulation matrix and the second accumulation matrix; and output information to adjust one or more lenses of the camera based on the autofocus statistics.

2. The computing device of claim 1, wherein the one or more horizontal filters comprise one or more horizontal infinite impulse response (IIR) filters, and wherein the one or more vertical filters comprise one or more vertical IIR filters.

3. The computing device of claim 2, wherein to apply the one or more horizontal filters to the image data, the one or more processors are further configured to:

apply a first horizontal IIR filter to the image data to generate a first horizontally filtered image data;

apply a second horizontal IIR filter to the first horizontally filtered image data to generate a second horizontally filtered image data; and generate the horizontally filtered image data based on the second horizontally filtered image data.

4. The computing device of claim 3, wherein to apply the one or more vertical filters to the image data, the one or more processors are further configured to:

apply a first vertical IIR filter to the image data to generate a first vertically filtered image data;

apply a second vertical IIR filter to the first vertically filtered image data to generate a second vertically filtered image data; and generate the vertically filtered image data based on the second vertically filtered image data.

5. The computing device of claim 4, wherein to concurrently apply the one or more horizontal filters to the image data and the one or more vertical filters to the image data, the one or more processors are further configured to:

concurrently perform one or more operations of applying the first horizontal IIR filter to the image data and one or more operations of applying the first vertical IIR filter to the image data.

6. The computing device of claim 4, wherein to concurrently apply the one or more horizontal filters to the image data and the one or more vertical filters to the image data, the one or more processors are further configured to:

concurrently perform one or more operations of applying the second horizontal IIR filter and generating the horizontally filtered image data, and one or more operations of applying the second vertical IIR filter and generating the vertically filtered image data.

7. The computing device of claim 1, wherein the autofocus statistics comprise a vertical sharpness for a region of interest and a horizontal sharpness for the region of interest, and wherein to determine the autofocus statistics based on the first accumulation matrix and the second accumulation matrix, the one or more processors are further configured to:

determine, based on the first accumulation matrix, the horizontal sharpness for the region of interest as a sum of sharpness values in the region of interest; and determine, based on the second accumulation matrix, the vertical sharpness for the region of interest as a sum of sharpness values in the region of interest.

8. The computing device of claim 7, wherein to determine the horizontal sharpness for the region of interest and determining the vertical sharpness for the region of interest, the one or more processors are further configured to:

determine the horizontal sharpness for the region of interest and the vertical sharpness for the region of interest.

9. The computing device of claim 1, wherein to determine the autofocus statistics based on the first accumulation matrix and the second accumulation matrix, the one or more processors are further configured to:

determine, for each of a plurality of regions of interest in the image data, a corresponding vertical sharpness and a corresponding horizontal sharpness.

10. A method comprising:

receiving image data obtained via an image sensor of a camera;

concurrently applying one or more horizontal filters to the image data to generate horizontally filtered image data and one or more vertical filters to the image data to generate vertically filtered image data;

generating a first accumulation matrix for the horizontally filtered image data;

generating a second accumulation matrix for the vertically filtered image data;

determining autofocus statistics based on the first accumulation matrix and the second accumulation matrix; and outputting information to adjust one or more lenses of the camera based on the autofocus statistics.

11. The method of claim 10, wherein the one or more horizontal filters comprise one or more horizontal infinite impulse response (IIR) filters, and wherein the one or more vertical filters comprise one or more vertical IIR filters.

12. The method of claim 11, wherein applying the one or more horizontal filters to the image data further comprises:

applying a first horizontal IIR filter to the image data to generate a first horizontally filtered image data;

applying a second horizontal IIR filter to the first horizontally filtered image data to generate a second horizontally filtered image data; and generating the horizontally filtered image data based on the second horizontally filtered image data.

13. The method of claim 12, wherein applying the one or more vertical filters to the image data further comprises:

applying a first vertical IIR filter to the image data to generate a first vertically filtered image data;

applying a second vertical IIR filter to the first vertically filtered image data to generate a second vertically filtered image data; and generating the vertically filtered image data based on the second vertically filtered image data.

14. The method of claim 13, wherein concurrently applying the one or more horizontal filters to the image data and the one or more vertical filters to the image data further comprises:

concurrently performing one or more operations of applying the first horizontal IIR filter to the image data and one or more operations of applying the first vertical IIR filter to the image data.

15. The method of claim 13, wherein concurrently applying the one or more horizontal filters to the image data and the one or more vertical filters to the image data further comprises:

concurrently performing one or more operations of applying the second horizontal IIR filter and generating the horizontally filtered image data, and one or more operations of applying the second vertical IIR filter and generating the vertically filtered image data.

16. The method of claim 10, wherein the autofocus statistics comprise a vertical sharpness for a region of interest and a horizontal sharpness for the region of interest, and wherein determining the autofocus statistics based on the first accumulation matrix and the second accumulation matrix further comprises:

determining, based on the first accumulation matrix, the horizontal sharpness for the region of interest as a sum of sharpness values in the region of interest; and determining, based on the second accumulation matrix, the vertical sharpness for the region of interest as a sum of sharpness values in the region of interest.

17. The method of claim 16, wherein determining the horizontal sharpness for the region of interest and determining the vertical sharpness for the region of interest further comprises:

determining the horizontal sharpness for the region of interest and the vertical sharpness for the region of interest.

18. A computer-readable storage medium storing instructions thereon that when executed cause one or more processors to:

receive image data obtained via an image sensor of a camera;

concurrently apply one or more horizontal filters to the image data to generate horizontally filtered image data and one or more vertical filters to the image data to generate vertically filtered image data;

generate a first accumulation matrix for the horizontally filtered image data;

generate a second accumulation matrix for the vertically filtered image data;

determine autofocus statistics based on the first accumulation matrix and the second accumulation matrix; and output information to adjust one or more lenses of the camera based on the autofocus statistics.

* * * * *